US011824962B2

(12) United States Patent
Masputra et al.

(10) Patent No.: US 11,824,962 B2
(45) Date of Patent: Nov. 21, 2023

(54) METHODS AND APPARATUS FOR SHARING AND ARBITRATION OF HOST STACK INFORMATION WITH USER SPACE COMMUNICATION STACKS

(71) Applicant: Apple Inc., Cupertino, CA (US)

(72) Inventors: Cahya Adiansyah Masputra, San Jose, CA (US); Sandeep Nair, San Jose, CA (US); Darrin Jewell, Woodside, CA (US); Prabhakar Lakhera, San Jose, CA (US); Thomas Francis Pauly, Cupertino, CA (US); Joshua Verweyst Graessley, Cupertino, CA (US); Wei Shen, Cupertino, CA (US); Olivier Mardinian, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/498,574

(22) Filed: Oct. 11, 2021

(65) Prior Publication Data

US 2022/0030095 A1     Jan. 27, 2022

Related U.S. Application Data

(62) Division of application No. 16/365,462, filed on Mar. 26, 2019, now Pat. No. 11,146,665.

(Continued)

(51) Int. Cl.
*H04L 29/06*     (2006.01)
*H04L 69/16*     (2022.01)
(Continued)

(52) U.S. Cl.
CPC .......... *H04L 69/162* (2013.01); *G06F 3/0604* (2013.01); *G06F 3/0631* (2013.01);
(Continued)

(58) Field of Classification Search
CPC ....... H04L 69/32; H04L 69/16; H04L 69/161; H04L 69/162; H04L 69/163;
(Continued)

(56) References Cited

U.S. PATENT DOCUMENTS 4,805,137 A   2/1989   Grant et al.
4,949,299 A   8/1990   Pickett
(Continued)

FOREIGN PATENT DOCUMENTS

EP     3013008 A1     4/2016
JP     H02306082 A    12/1990
(Continued)

OTHER PUBLICATIONS

Gopalakrishnan R., et al., "Efficient User-Space Protocol Implementations with QoS Guarantees Using Real-Time Upcalls", IEEE/ACM Transactions on Networking, Aug. 1998, vol. 6 (4), pp. 374-388.

(Continued)

*Primary Examiner* — Jungwon Chang
(74) *Attorney, Agent, or Firm* — Sterne, Kessler, Goldstein & Fox P.L.L.C.

(57) ABSTRACT

Methods and apparatus for efficient data transfer within a user space network stack. Unlike prior art monolithic networking stacks, the exemplary networking stack architecture described hereinafter includes various components that span multiple domains (both in-kernel, and non-kernel). For example, unlike traditional "socket" based communication, disclosed embodiments can transfer data directly between the kernel and user space domains. Direct transfer reduces the per-byte and per-packet costs relative to socket based communication. A user space networking stack is disclosed that enables extensible, cross-platform-capable, user space control of the networking protocol stack functionality. The (Continued)

user space networking stack facilitates tighter integration between the protocol layers (including TLS) and the application or daemon. Exemplary systems can support multiple networking protocol stack instances (including an in-kernel traditional network stack).

20 Claims, 14 Drawing Sheets

Related U.S. Application Data

(60) Provisional application No. 62/649,509, filed on Mar. 28, 2018.

(51) Int. Cl.

| | | |
|---|---|---|
| H04L 69/163 | (2022.01) | |
| H04L 69/164 | (2022.01) | |
| H04L 12/46 | (2006.01) | |
| G06F 9/54 | (2006.01) | |
| H04L 9/40 | (2022.01) | |
| G06F 9/48 | (2006.01) | |
| G06F 9/50 | (2006.01) | |
| G06F 12/10 | (2016.01) | |
| G06F 13/16 | (2006.01) | |
| G06F 3/06 | (2006.01) | |
| G06F 9/46 | (2006.01) | |
| G06F 12/02 | (2006.01) | |
| H04L 47/2475 | (2022.01) | |
| H04L 47/2483 | (2022.01) | |
| H04L 47/6295 | (2022.01) | |
| H04L 49/00 | (2022.01) | |
| H04L 49/9047 | (2022.01) | |
| H04L 69/00 | (2022.01) | |
| G06F 9/455 | (2018.01) | |
| H04L 47/193 | (2022.01) | |
| H04L 47/283 | (2022.01) | |
| G06F 9/52 | (2006.01) | |
| H04L 43/0864 | (2022.01) | |
| G06F 16/23 | (2019.01) | |
| G06F 21/52 | (2013.01) | |
| H04L 47/24 | (2022.01) | |
| H04L 47/30 | (2022.01) | |
| H04L 47/32 | (2022.01) | |
| H04L 47/6275 | (2022.01) | |
| G06F 21/56 | (2013.01) | |
| H04L 69/22 | (2022.01) | |
| G06F 16/22 | (2019.01) | |
| H04L 61/103 | (2022.01) | |
| H04L 61/2503 | (2022.01) | |
| H04L 67/146 | (2022.01) | |
| H04L 69/18 | (2022.01) | |
| H04L 1/00 | (2006.01) | |

(52) U.S. Cl.
CPC .......... *G06F 3/0644* (2013.01); *G06F 3/0673* (2013.01); *G06F 9/45558* (2013.01); *G06F 9/461* (2013.01); *G06F 9/4881* (2013.01); *G06F 9/5005* (2013.01); *G06F 9/5016* (2013.01); *G06F 9/5022* (2013.01); *G06F 9/52* (2013.01); *G06F 9/542* (2013.01); *G06F 9/545* (2013.01); *G06F 12/023* (2013.01); *G06F 12/10* (2013.01); *G06F 13/1668* (2013.01); *G06F 16/2228* (2019.01); *G06F 16/2365* (2019.01); *G06F 21/52* (2013.01); *G06F 21/568* (2013.01); *H04L 12/4641* (2013.01); *H04L 43/0864* (2013.01); *H04L 47/193* (2013.01); *H04L 47/2458* (2013.01); *H04L 47/2475* (2013.01); *H04L 47/2483* (2013.01); *H04L 47/283* (2013.01); *H04L 47/30* (2013.01); *H04L 47/32* (2013.01); *H04L 47/6275* (2013.01); *H04L 47/6295* (2013.01); *H04L 49/30* (2013.01); *H04L 49/9052* (2013.01); *H04L 61/103* (2013.01); *H04L 61/2542* (2013.01); *H04L 63/166* (2013.01); *H04L 67/146* (2013.01); *H04L 69/02* (2013.01); *H04L 69/161* (2013.01); *H04L 69/163* (2013.01); *H04L 69/164* (2013.01); *H04L 69/18* (2013.01); *H04L 69/22* (2013.01); *G06F 9/50* (2013.01); *G06F 2009/45595* (2013.01); *G06F 2209/5011* (2013.01); *G06F 2212/657* (2013.01); *G06F 2221/032* (2013.01); *G06F 2221/034* (2013.01); *H04L 1/0061* (2013.01)

(58) Field of Classification Search
CPC ....... H04L 69/164; H04L 69/02; H04L 69/22; H04L 69/18; H04L 12/4641; H04L 47/2475; H04L 47/2483; H04L 47/6295; H04L 47/193; H04L 47/283; H04L 47/2458; H04L 47/30; H04L 47/32; H04L 47/6275; H04L 63/166; H04L 49/30; H04L 49/9052; H04L 61/103; H04L 61/2542; H04L 1/0061; H04L 43/0864; H04L 67/146; G06F 3/0662; G06F 9/545; G06F 9/542; G06F 9/4881; G06F 9/5016; G06F 9/461; G06F 9/5022; G06F 9/45558; G06F 9/5005; G06F 9/52; G06F 9/50; G06F 12/10; G06F 12/023; G06F 13/1668; G06F 16/2365; G06F 16/2228; G06F 3/0604; G06F 3/0631; G06F 3/0644; G06F 3/0673; G06F 21/52; G06F 21/568; G06F 2212/657; G06F 2009/45595; G06F 2009/5011; G06F 2221/034; G06F 2221/032

See application file for complete search history.

(56) References Cited

U.S. PATENT DOCUMENTS

| | | |
|---|---|---|
| 5,367,688 A | 11/1994 | Croll |
| 5,467,459 A | 11/1995 | Alexander et al. |
| 5,485,578 A | 1/1996 | Sweazey |
| 5,506,968 A | 4/1996 | Dukes |
| 5,613,086 A | 3/1997 | Frey et al. |
| 5,659,542 A | 8/1997 | Bell et al. |
| 5,708,779 A | 1/1998 | Graziano et al. |
| 5,731,973 A | 3/1998 | Takaishi et al. |
| 5,850,395 A | 12/1998 | Hauser et al. |
| 5,903,564 A | 5/1999 | Ganmukhi et al. |
| 5,943,507 A | 8/1999 | Cornish et al. |
| 6,008,992 A | 12/1999 | Kawakami |
| 6,032,179 A | 2/2000 | Osborne |
| 6,216,178 B1 | 4/2001 | Stracovsky et al. |
| 6,233,702 B1 | 5/2001 | Horst et al. |
| 6,260,152 B1 | 7/2001 | Cole et al. |
| 6,349,355 B1 | 2/2002 | Draves et al. |
| 6,359,863 B1 | 3/2002 | Varma et al. |
| 6,411,997 B1 | 6/2002 | Dawes et al. |
| 6,485,081 B1 | 11/2002 | Bingle et al. |
| 6,523,073 B1 | 2/2003 | Kammer et al. |
| 6,553,446 B1 | 4/2003 | Miller |
| 6,693,895 B1 | 2/2004 | Crummey et al. |
| 6,815,873 B2 | 11/2004 | Johnson et al. |
| 6,874,075 B2 | 3/2005 | Jerding et al. |
| 6,948,094 B2 | 9/2005 | Schultz et al. |
| 6,973,701 B2 | 12/2005 | Momoda et al. |
| 6,990,594 B2 | 1/2006 | Kim |

(56) References Cited

U.S. PATENT DOCUMENTS

| | | |
|---|---|---|
| 7,013,536 B2 | 3/2006 | Golden et al. |
| 7,032,282 B2 | 4/2006 | Powell et al. |
| 7,100,020 B1 | 8/2006 | Brightman et al. |
| 7,111,307 B1 | 9/2006 | Wang |
| 7,127,600 B2 | 10/2006 | Zimmer et al. |
| 7,152,231 B1 | 12/2006 | Galluscio et al. |
| 7,281,172 B2 | 10/2007 | Chujo |
| 7,397,774 B1 | 7/2008 | Holland et al. |
| 7,398,382 B2 | 7/2008 | Rothman et al. |
| 7,403,542 B1 | 7/2008 | Thompson |
| 7,506,084 B2 | 3/2009 | Moerti et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,681,012 B2 | 3/2010 | Verma et al. |
| 7,685,476 B2 | 3/2010 | Andre et al. |
| 7,802,256 B2 | 9/2010 | Havens |
| 7,853,731 B1 | 12/2010 | Zeng |
| 7,899,941 B2 | 3/2011 | Hendry et al. |
| 7,941,682 B2 | 5/2011 | Adams |
| 8,214,707 B2 | 7/2012 | Munson et al. |
| 8,230,248 B2 | 7/2012 | Dance et al. |
| 8,239,947 B1 | 8/2012 | Glick et al. |
| 8,255,725 B2 | 8/2012 | Shimazaki et al. |
| 8,271,996 B1 * | 9/2012 | Gould .................. G06F 9/542 719/330 |
| 8,352,624 B2 | 1/2013 | Zimmerman et al. |
| 8,468,285 B2 | 6/2013 | Kobayashi |
| 8,555,099 B2 | 10/2013 | Marinkovic et al. |
| 8,561,090 B2 | 10/2013 | Schneider |
| 8,635,412 B1 | 1/2014 | Wilshire |
| 8,656,228 B2 | 2/2014 | Check et al. |
| 8,769,168 B2 | 7/2014 | Moertl et al. |
| 8,788,822 B1 | 7/2014 | Riddle |
| 8,799,537 B1 | 8/2014 | Zhu et al. |
| 8,806,640 B2 | 8/2014 | Wang |
| 8,819,386 B1 | 8/2014 | Mather |
| 8,848,809 B2 | 9/2014 | Whitby-Strevens |
| 8,855,120 B2 | 10/2014 | Robbins |
| 8,876,062 B1 | 11/2014 | Baghdasarian |
| 9,049,179 B2 | 6/2015 | Luna |
| 9,130,864 B2 | 9/2015 | Keith |
| 9,135,059 B2 | 9/2015 | Ballard et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,483,305 B1 | 11/2016 | Shmidt et al. |
| 9,544,069 B2 | 1/2017 | Whitby-Strevens et al. |
| 9,547,535 B1 | 1/2017 | Wilt |
| 9,594,718 B2 | 3/2017 | Kaushik et al. |
| 9,769,756 B1 | 9/2017 | Cui et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,932,757 B2 | 4/2018 | Hager |
| 9,959,124 B1 | 5/2018 | Herbeck et al. |
| 9,985,904 B2 | 5/2018 | Shalev et al. |
| 10,078,361 B2 | 9/2018 | Sanghi et al. |
| 10,230,608 B2 | 3/2019 | Tsirkin |
| 10,289,555 B1 | 5/2019 | Michaud et al. |
| 10,331,600 B1 | 6/2019 | Rajadnya et al. |
| 10,331,612 B1 | 6/2019 | Petkov et al. |
| 10,534,601 B1 | 1/2020 | Venkata et al. |
| 10,552,072 B1 * | 2/2020 | Bono .................... G06F 3/0662 |
| 10,678,432 B1 | 6/2020 | Dreier et al. |
| 10,798,059 B1 | 10/2020 | Singh et al. |
| 10,798,224 B2 | 10/2020 | Masputra et al. |
| 10,819,831 B2 | 10/2020 | Masputra et al. |
| 10,999,132 B1 | 5/2021 | Sagar et al. |
| 11,095,758 B2 | 8/2021 | Masputra et al. |
| 11,146,665 B2 | 10/2021 | Masputra et al. |
| 11,159,651 B2 | 10/2021 | Masputra et al. |
| 11,178,259 B2 | 11/2021 | Masputra et al. |
| 11,178,260 B2 | 11/2021 | Masputra et al. |
| 11,212,373 B2 | 12/2021 | Masputra et al. |
| 11,368,560 B2 | 6/2022 | Masputra et al. |
| 11,477,123 B2 | 10/2022 | Masputra et al. |
| 11,558,348 B2 | 1/2023 | Masputra et al. |
| 2001/0037410 A1 | 11/2001 | Gardner |
| 2002/0013868 A1 | 1/2002 | West |
| 2002/0044553 A1 | 4/2002 | Chakravorty |
| 2002/0053011 A1 | 5/2002 | Aiken et al. |
| 2002/0065867 A1 | 5/2002 | Chauvel |
| 2002/0169938 A1 | 11/2002 | Scott et al. |
| 2002/0195177 A1 | 12/2002 | Hinkley et al. |
| 2003/0014607 A1 | 1/2003 | Slavin et al. |
| 2003/0061395 A1 | 3/2003 | Kingsbury et al. |
| 2003/0120935 A1 | 6/2003 | Teal et al. |
| 2003/0200413 A1 | 10/2003 | Gurumoorthy et al. |
| 2004/0010473 A1 | 1/2004 | Hsu et al. |
| 2004/0010545 A1 | 1/2004 | Pandya |
| 2004/0044929 A1 | 3/2004 | Chujo |
| 2004/0105384 A1 | 6/2004 | Gallezot et al. |
| 2004/0128568 A1 | 7/2004 | O'Shea |
| 2004/0179546 A1 | 9/2004 | McDaniel et al. |
| 2004/0201749 A1 | 10/2004 | Malloy Desormeaux |
| 2004/0221056 A1 | 11/2004 | Kobayashi |
| 2004/0228365 A1 | 11/2004 | Kobayashi |
| 2004/0249957 A1 * | 12/2004 | Ekis ..................... H04L 69/16 709/228 |
| 2005/0055406 A1 | 3/2005 | Singhai et al. |
| 2005/0076196 A1 | 4/2005 | Zimmer et al. |
| 2005/0076244 A1 | 4/2005 | Watanabe |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0138628 A1 | 6/2005 | Bradford et al. |
| 2005/0140683 A1 | 6/2005 | Collins et al. |
| 2005/0149711 A1 | 7/2005 | Zimmer et al. |
| 2005/0157781 A1 | 7/2005 | Ho et al. |
| 2005/0198777 A1 | 9/2005 | Mabe |
| 2005/0278498 A1 | 12/2005 | Ahluwalia et al. |
| 2005/0285862 A1 | 12/2005 | Noda et al. |
| 2006/0039285 A1 | 2/2006 | Chapman et al. |
| 2006/0047989 A1 | 3/2006 | Delgado et al. |
| 2006/0075119 A1 * | 4/2006 | Hussain ............... H04L 69/162 709/227 |
| 2006/0107071 A1 | 5/2006 | Girish et al. |
| 2006/0136570 A1 | 6/2006 | Pandya |
| 2006/0186700 A1 | 8/2006 | Browne et al. |
| 2006/0186706 A1 | 8/2006 | Browne et al. |
| 2006/0215697 A1 | 9/2006 | Olderdissen |
| 2006/0218301 A1 | 9/2006 | O'Toole et al. |
| 2006/0232051 A1 | 10/2006 | Morris et al. |
| 2006/0248542 A1 | 11/2006 | Wang et al. |
| 2007/0005869 A1 | 1/2007 | Balraj et al. |
| 2007/0008983 A1 | 1/2007 | Van Doren et al. |
| 2007/0043901 A1 | 2/2007 | Wu et al. |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0086480 A1 | 4/2007 | Elzur |
| 2007/0118831 A1 | 5/2007 | Kondo |
| 2007/0180041 A1 | 8/2007 | Suzuoki |
| 2007/0183418 A1 | 8/2007 | Riddoch et al. |
| 2007/0201492 A1 | 8/2007 | Kobayashi |
| 2007/0226375 A1 | 9/2007 | Chu et al. |
| 2007/0226417 A1 | 9/2007 | Davis |
| 2007/0255802 A1 | 11/2007 | Aloni et al. |
| 2007/0255866 A1 * | 11/2007 | Aloni ................... H04L 69/161 710/52 |
| 2007/0261307 A1 | 11/2007 | Alexander |
| 2007/0286246 A1 | 12/2007 | Kobayashi |
| 2008/0005794 A1 | 1/2008 | Inoue et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |

(56) References Cited

U.S. PATENT DOCUMENTS

| | | |
|---|---|---|
| 2008/0127292 A1 | 5/2008 | Cooper et al. |
| 2008/0148291 A1 | 6/2008 | Huang et al. |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0006920 A1 | 1/2009 | Munson et al. |
| 2009/0024924 A1 | 1/2009 | Kim |
| 2009/0092057 A1 | 4/2009 | Doctor et al. |
| 2009/0113141 A1 | 4/2009 | Bullman et al. |
| 2009/0138650 A1 | 5/2009 | Lin et al. |
| 2009/0172674 A1 | 7/2009 | Bobak et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0240874 A1 | 9/2009 | Pong |
| 2009/0265723 A1 | 10/2009 | Mochizuki et al. |
| 2009/0322531 A1 | 12/2009 | Estevez et al. |
| 2010/0005014 A1 | 1/2010 | Castle et al. |
| 2010/0017655 A1 | 1/2010 | Gooding et al. |
| 2010/0049876 A1 | 2/2010 | Pope et al. |
| 2010/0057932 A1* | 3/2010 | Pope .............. H04L 69/32 709/236 |
| 2010/0082859 A1 | 4/2010 | Hendry et al. |
| 2010/0098419 A1 | 4/2010 | Levy et al. |
| 2010/0118041 A1 | 5/2010 | Chen et al. |
| 2010/0329319 A1 | 12/2010 | Dai et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0161619 A1 | 6/2011 | Kaminski et al. |
| 2011/0219208 A1 | 9/2011 | Asaad et al. |
| 2011/0242425 A1 | 10/2011 | Zeng |
| 2011/0246742 A1 | 10/2011 | Kogen et al. |
| 2011/0276710 A1 | 11/2011 | Mighani et al. |
| 2011/0292936 A1 | 12/2011 | Wang et al. |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0036334 A1 | 2/2012 | Horman et al. |
| 2012/0072658 A1 | 3/2012 | Hashimoto |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama |
| 2012/0203880 A1 | 8/2012 | Kluyt et al. |
| 2012/0224640 A1 | 9/2012 | Sole Rojals et al. |
| 2012/0229076 A1 | 9/2012 | Zhu et al. |
| 2012/0260017 A1 | 10/2012 | Mine et al. |
| 2013/0039278 A1 | 2/2013 | Bouazizi et al. |
| 2013/0050216 A1 | 2/2013 | Whitby-Strevens et al. |
| 2013/0057567 A1 | 3/2013 | Frank et al. |
| 2013/0067188 A1 | 3/2013 | Mehra et al. |
| 2013/0091772 A1 | 4/2013 | Berger et al. |
| 2013/0111014 A1 | 5/2013 | Lawrie et al. |
| 2013/0138840 A1 | 5/2013 | Kegel et al. |
| 2013/0162911 A1 | 6/2013 | Glen |
| 2013/0204927 A1 | 8/2013 | Kruglikov et al. |
| 2013/0205113 A1 | 8/2013 | Ahmad et al. |
| 2013/0275976 A1 | 10/2013 | Dawson et al. |
| 2013/0290947 A1 | 10/2013 | Li |
| 2013/0347131 A1 | 12/2013 | Mooring et al. |
| 2014/0033220 A1 | 1/2014 | Campbell et al. |
| 2014/0068624 A1 | 3/2014 | Fuller et al. |
| 2014/0068636 A1 | 3/2014 | Dupont et al. |
| 2014/0122695 A1 | 5/2014 | Kulikov et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang |
| 2014/0247983 A1 | 9/2014 | MacInnis et al. |
| 2014/0355606 A1 | 12/2014 | Riddoch et al. |
| 2015/0007262 A1 | 1/2015 | Aissi et al. |
| 2015/0036051 A1 | 2/2015 | Broberg et al. |
| 2015/0058444 A1* | 2/2015 | Willmann .............. G06F 9/545 709/217 |
| 2015/0081985 A1 | 3/2015 | Archer et al. |
| 2015/0156122 A1 | 6/2015 | Singh et al. |
| 2015/0172345 A1 | 6/2015 | Mantin et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0244804 A1 | 8/2015 | Warfield et al. |
| 2015/0261588 A1 | 9/2015 | Liu et al. |
| 2015/0309940 A1 | 10/2015 | Kumar |
| 2015/0326542 A1 | 11/2015 | Serebrin |
| 2015/0363110 A1 | 12/2015 | Batra et al. |
| 2015/0370582 A1 | 12/2015 | Kinsella et al. |
| 2015/0378737 A1 | 12/2015 | Debbage et al. |
| 2016/0028635 A1 | 1/2016 | Wang |
| 2016/0034195 A1 | 2/2016 | Li et al. |
| 2016/0041852 A1 | 2/2016 | Suarez Gracia et al. |
| 2016/0044143 A1 | 2/2016 | Narasimhamurthy |
| 2016/0063258 A1 | 3/2016 | Ackerly |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0208539 A1 | 7/2016 | Hofmann et al. |
| 2016/0224442 A1 | 8/2016 | Sanghi et al. |
| 2016/0226957 A1 | 8/2016 | Zhang et al. |
| 2016/0226967 A1 | 8/2016 | Zhang et al. |
| 2016/0231929 A1 | 8/2016 | Tsirkin |
| 2016/0261632 A1 | 9/2016 | Kolhi et al. |
| 2016/0269991 A1 | 9/2016 | Van Greunen et al. |
| 2016/0357443 A1 | 12/2016 | Li et al. |
| 2016/0363955 A1 | 12/2016 | Stevens et al. |
| 2016/0364350 A1 | 12/2016 | Sanghi et al. |
| 2016/0378545 A1 | 12/2016 | Ho |
| 2017/0003977 A1 | 1/2017 | Sumida et al. |
| 2017/0003997 A1 | 1/2017 | Kelly et al. |
| 2017/0075856 A1 | 3/2017 | Suzue et al. |
| 2017/0089641 A1 | 3/2017 | Humfeld et al. |
| 2017/0108912 A1 | 4/2017 | Li et al. |
| 2017/0111283 A1 | 4/2017 | Kumar et al. |
| 2017/0124327 A1 | 5/2017 | Kumbhar et al. |
| 2017/0126726 A1 | 5/2017 | Han |
| 2017/0147282 A1 | 5/2017 | Seo |
| 2017/0149890 A1 | 5/2017 | Shamis et al. |
| 2017/0187621 A1 | 6/2017 | Shalev et al. |
| 2017/0187846 A1 | 6/2017 | Shalev et al. |
| 2017/0249098 A1 | 8/2017 | Petkov et al. |
| 2017/0264497 A1 | 9/2017 | Lim |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0308460 A1 | 10/2017 | Guthula et al. |
| 2017/0337588 A1 | 11/2017 | Chittilappilly et al. |
| 2017/0353499 A1 | 12/2017 | Huang et al. |
| 2017/0371591 A1 | 12/2017 | Xia et al. |
| 2018/0004690 A1 | 1/2018 | Kaminski et al. |
| 2018/0070341 A1 | 3/2018 | Islam et al. |
| 2018/0081829 A1 | 3/2018 | Kaplan |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0173643 A1 | 6/2018 | Yu et al. |
| 2018/0196648 A1 | 7/2018 | Henderson et al. |
| 2018/0219805 A1 | 8/2018 | MacNeil et al. |
| 2018/0219976 A1 | 8/2018 | Decenzo et al. |
| 2018/0239657 A1 | 8/2018 | Petrbok et al. |
| 2018/0248847 A1 | 8/2018 | Guri et al. |
| 2018/0253315 A1 | 9/2018 | Norton et al. |
| 2018/0285561 A1 | 10/2018 | Frank et al. |
| 2018/0295052 A1 | 10/2018 | St-Laurent |
| 2018/0329743 A1* | 11/2018 | Pope .................. G06F 11/0793 |
| 2018/0343206 A1 | 11/2018 | White et al. |
| 2018/0357176 A1 | 12/2018 | Wang |
| 2019/0007850 A1 | 1/2019 | DenBoer et al. |
| 2019/0036893 A1 | 1/2019 | Jiang |
| 2019/0052659 A1 | 2/2019 | Weingarten et al. |

(56) References Cited

U.S. PATENT DOCUMENTS

| | | |
|---|---|---|
| 2019/0065301 A1 | 2/2019 | Tsirkin et al. |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0140983 A1 | 5/2019 | Tu et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0213166 A1 | 7/2019 | Petkov et al. |
| 2019/0253351 A1 | 8/2019 | Ihlar et al. |
| 2019/0286466 A1 | 9/2019 | Tsirkin et al. |
| 2019/0303204 A1 | 10/2019 | Masputra et al. |
| 2019/0303205 A1 | 10/2019 | Masputra et al. |
| 2019/0303221 A1 | 10/2019 | Masputra et al. |
| 2019/0303222 A1 | 10/2019 | Masputra et al. |
| 2019/0303280 A1 | 10/2019 | Masputra et al. |
| 2019/0303562 A1 | 10/2019 | Masputra et al. |
| 2019/0303576 A1 | 10/2019 | Masputra et al. |
| 2019/0306076 A1 | 10/2019 | Masputra et al. |
| 2019/0306087 A1 | 10/2019 | Masputra et al. |
| 2019/0306109 A1 | 10/2019 | Masputra et al. |
| 2019/0306281 A1 | 10/2019 | Masputra et al. |
| 2019/0306282 A1 | 10/2019 | Masputra et al. |
| 2020/0019695 A1 | 1/2020 | Sovio et al. |
| 2020/0036615 A1 | 1/2020 | Lewis |
| 2020/0045015 A1 | 2/2020 | Nukala et al. |
| 2020/0065244 A1 | 2/2020 | Sanghi et al. |
| 2020/0073829 A1 | 3/2020 | Tsirkin et al. |
| 2020/0195684 A1 | 6/2020 | Linz |
| 2021/0011856 A1 | 1/2021 | Xia et al. |
| 2021/0097006 A1 | 4/2021 | Masputra et al. |
| 2021/0099391 A1 | 4/2021 | Masputra et al. |
| 2021/0099427 A1 | 4/2021 | Masputra et al. |
| 2022/0046117 A1 | 2/2022 | Masputra et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| WO | WO 2008070138 A2 | 6/2008 |

OTHER PUBLICATIONS

Moon-Sang Lee, Joonwon Lee and S. Maeng, "Context-aware address translation for high-performance SMP cluster system," 2008u IEEE International Conference on Cluster Computing, Tsukuba, 2008, pp. 292-297, doi: 10.1109/CLUSTR.2008.4663784. (Year:2008).

Honda, et al., "Rekindling Network Protocol Innovation with User-Level Stacks", ACM SIGCOMM Computer Communication Review, vol. 44, No. 2, Apr. 2014.

ECN L1 PM Substates with CLKREQ approved Aug. 23, 2012.

Jackson, "PCI Express Technology", Sep. 2012 (Sep. 2012), MindShare Press, xP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

Whitworth, "Improving Networking by moving the network stack to userspace", Imperial College London, Jun. 14, 2010 [Mar. 17, 2022]; retrieved from the Internet: <URL https://www.doc.ic.ac.uk/teaching/distinguished-projects/2010/m.whitworth.pdf> (Year: 2010).

* cited by examiner

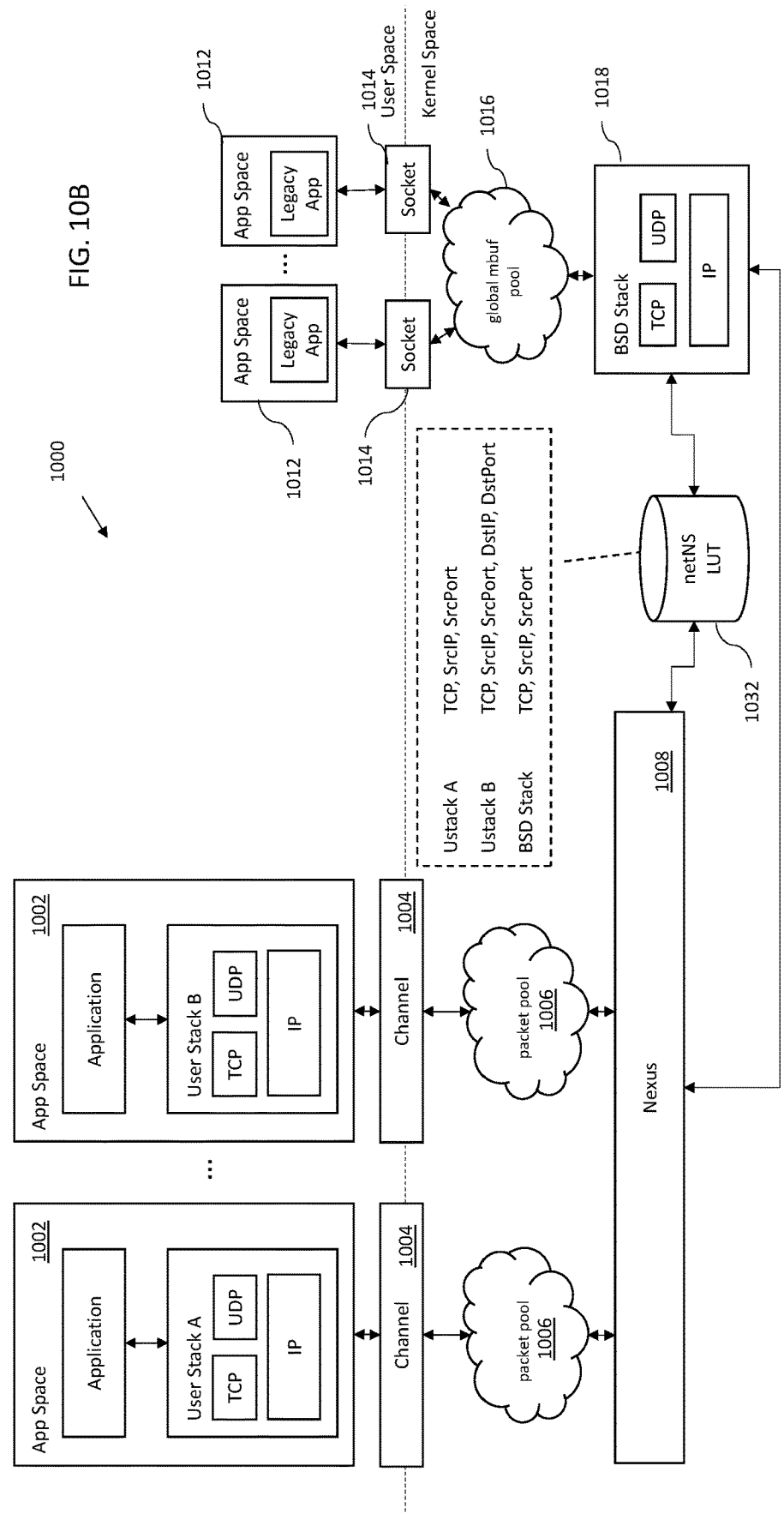

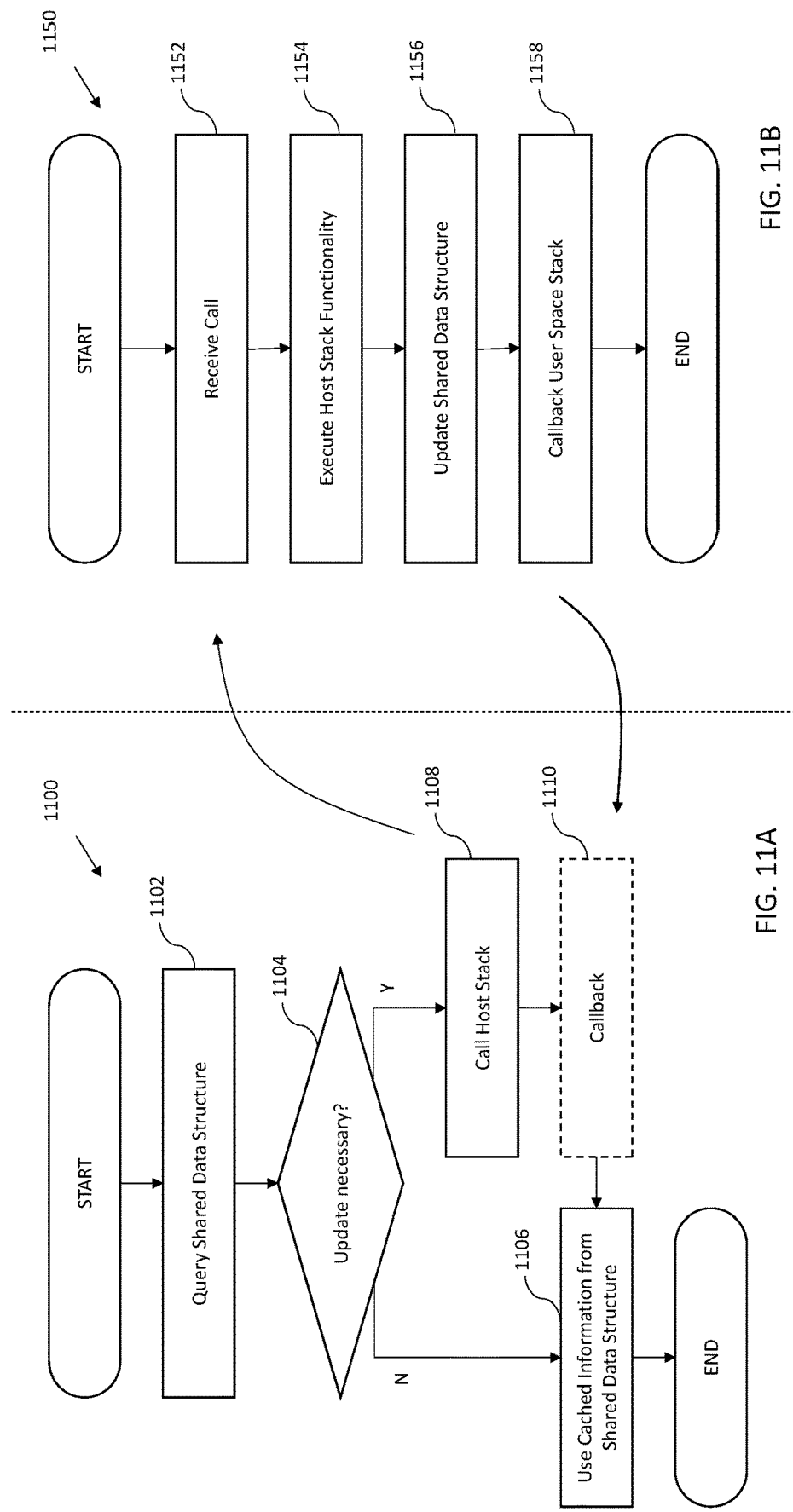

METHODS AND APPARATUS FOR SHARING AND ARBITRATION OF HOST STACK INFORMATION WITH USER SPACE COMMUNICATION STACKS

PRIORITY

This application is a divisional of U.S. Non-Provisional patent application Ser. No. 16/365,462 filed Mar. 26, 2019 and entitled "Methods And Apparatus For Sharing And Arbitration Of Host Stack Information With User Space Communication Stacks", which claims the benefit of U.S. Provisional Patent Application Ser. No. 62/649,509 filed Mar. 28, 2018 and entitled "Methods and Apparatus for Efficient Data Transfer within User Space Networking Stack Infrastructures", both of which are incorporated herein by reference in their entireties.

RELATED APPLICATIONS

This application incorporates by reference the following: U.S. patent application Ser. No. 16/144,992 filed Sep. 27, 2018 and entitled "Methods and Apparatus for Single Entity Buffer Pool Management", U.S. patent application Ser. No. 16/146,533 filed Sep. 28, 2018 and entitled "Methods and Apparatus for Regulating Networking Traffic in Bursty System Conditions", U.S. patent application Ser. No. 16/146,324 filed Sep. 28, 2018 and entitled "Methods and Apparatus for Preventing Packet Spoofing with User Space Communication Stacks", U.S. patent application Ser. No. 16/146,916 filed Sep. 28, 2018 and entitled "Methods and Apparatus for Channel Defunct Within User Space Stack Architectures", U.S. patent application Ser. No. 16/236,032 filed Dec. 28, 2018 and entitled "Methods and Apparatus for Classification of Flow Metadata with User Space Communication Stacks", U.S. patent application Ser. No. 16/363,495 filed Mar. 25, 2019 and entitled "Methods and Apparatus for Dynamic Packet Pool Configuration in Networking Stack Infrastructures", and U.S. patent application Ser. No. 16/365,462 filed herewith on Mar. 26, 2019 and entitled "Methods and Apparatus for Virtualized Hardware Optimizations for User Space Networking", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of electronic devices, as well as networks thereof. More particularly, the disclosure is directed to methods and apparatus for implementing computerized networking stack infrastructures. Various aspects of the present disclosure are directed to, in one exemplary aspect, data transfer within user space networking stack infrastructures.

DESCRIPTION OF RELATED TECHNOLOGY

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past years new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of user applications (e.g., media playback, real-time or interactive network applications) would benefit from workload-specific customizations and performance optimizations of the networking stack.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should preserve backwards compatibility with the traditional in-kernel networking stack. More generally, improved methods and apparatus for manipulating and/or controlling lower layer networking communication protocols by higher layer software applications is desired.

SUMMARY

The present disclosure satisfies the foregoing needs by providing, inter alia, methods and apparatus for data transfer within user space networking stack infrastructures.

A method for sharing and arbitration of network namespace with a user space communication stack is disclosed. In one exemplary embodiment, the method includes: requesting a tuple entry for a user space communication stack from a shared namespace registry where the shared namespace registry includes one or more tuple entries of a host stack; determining whether a shared namespace registry is up-to-date; and causing a registration of the tuple entry for the user space communication stack.

In one variant, requesting the tuple entry for the user space communication stack includes calling a kernel space process. In one such case, calling the kernel space process includes calling the host stack. In one such exemplary case, calling the host stack includes providing a callback cookie data structure.

In one variant, causing the registration of the tuple entry for the user space communication stack includes providing a source port and a protocol identifier. For example, causing the registration of the tuple entry for the user space communication stack further includes providing a destination port.

In one variant, the method includes using a cached shared namespace registry.

A method for network event based notifications is disclosed. In one embodiment, the method includes: receiving a request to register for a network event from a user space entity, where the request includes a callback cookie data structure; executing host stack functionality with a kernel space stack; updating a shared data structure with host stack information associated with the network event; and calling back the user space entity with the callback cookie data structure.

In one variant, executing the host stack functionality includes an Address Resolution Protocol (ARP) look up.

In one variant, executing the host stack functionality includes receiving an Internet Control Message Packet (ICMP).

In one variant, executing the host stack functionality includes renewing an internet protocol (IP) address for a network interface.

In one variant, the user space entity is a nexus entity that services multiple user stack entities.

In one variant, the user space entity is a user space networking stack.

In one variant, calling back the user space entity with the callback cookie data structure further includes calling back multiple user space entities that have requested registration for the network event.

A method for setting system-wide parameters for communication stack coexistence devices is described. In one exemplary embodiment, the method includes: storing one or more system control parameters within a shared data structure; initializing a host communication stack based on the one or more system control parameters; initializing at least one other communication stack based on the one or more system control parameters; and where the host communication stack and the at least one other communication stack share a common resource.

In one variant, the common resource is a TCP/IP network interface driver.

In one variant, the method further includes updating a first system control parameter and re-initializing the at least one other communication stack based on the first system control parameter.

In one variant, the method further includes updating a first system control parameter and initializing another communication stack based on the first system control parameter.

In one variant, the at least one other communication stack can only read the shared data structure. In one such case, the host communication stack can read and write the shared data structure.

In another aspect, methods and apparatus for host stack coexistence and NetNS for port tuple arbitration are disclosed. In one embodiment, an efficient mechanism to share and arbitrate e.g., the 5-tuple network namespace (i.e. access to use which port on which source address, etc.) is provided. In one variant, a USNSI architecture implements a shared namespace manager (NetNS) to enable sharing and arbitration of the network namespace between the various stack instances.

In another aspect, methods and apparatus for host stack coexistence are disclosed. In one embodiment, a USNSI leverages existing functions in a BSD stack to handle those types of packets. A process (e.g., flow-switch), when seeing those packets, forward them to BSD stack, and the USNSI then registers callbacks for events from those BSD stacks, as well as query information for its flow management, etc.

In another aspect, methods and apparatus for system-wide sysctl via shared memory (RO) are disclosed. In one embodiment, a USNSI implements a system-wide sysctl shared memory region shared by all processes to minimize memory usage; in one variant, it is controllable by user via sysctl command to allow easy tuning, and is readable and controllable by kernel network stack if needed.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIGS. 10A-10D are logical representations of a system for sharing host stack information with other communication stacks, in accordance with various aspects of the present disclosure.

FIGS. 11A-11B are logical representations of methods for sharing host stack information with other communication stacks, in accordance with various aspects of the present disclosure.

All figures © Copyright 2017-2019 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While embodiments are primarily discussed in the context of use in conjunction with an inter-processor communication (IPC) link such as that described in, for example, commonly owned U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS", now U.S. Pat. No. 10,078,361, and co-owned and co-pending U.S. patent application Ser. No. 16/112,480 filed Aug. 24, 2018 and entitled "Methods and Apparatus for Control of a Jointly Shared Memory-Mapped Region", each of which being incorporated herein by reference in its entirety, it will be recognized by those of ordinary skill that the present disclosure is not so limited.

Existing Network Socket Technologies—

Figure 1:
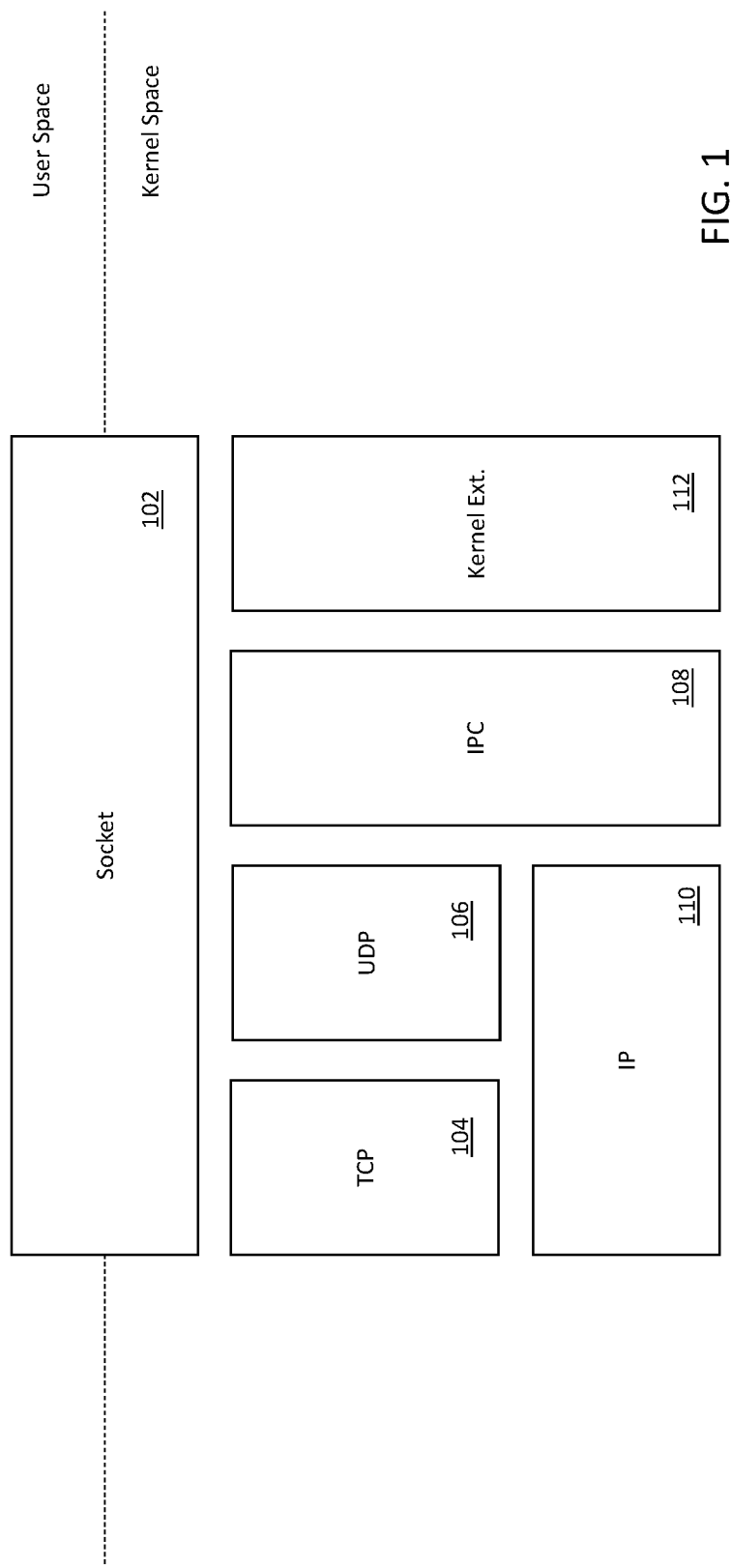
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" may refer to software that controls and manages access to hardware. An 0/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies—

Figure 2:
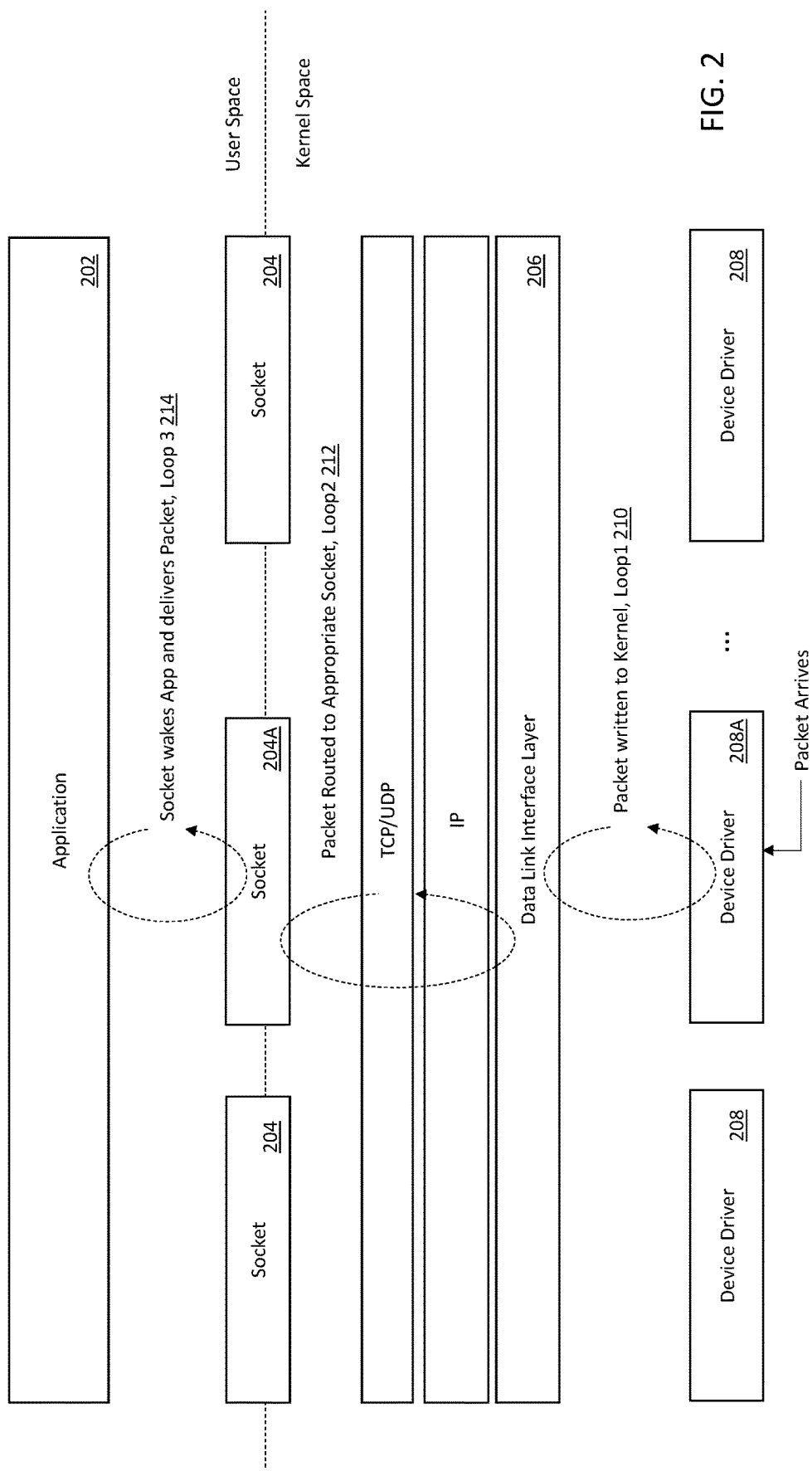
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases

Figure 3:
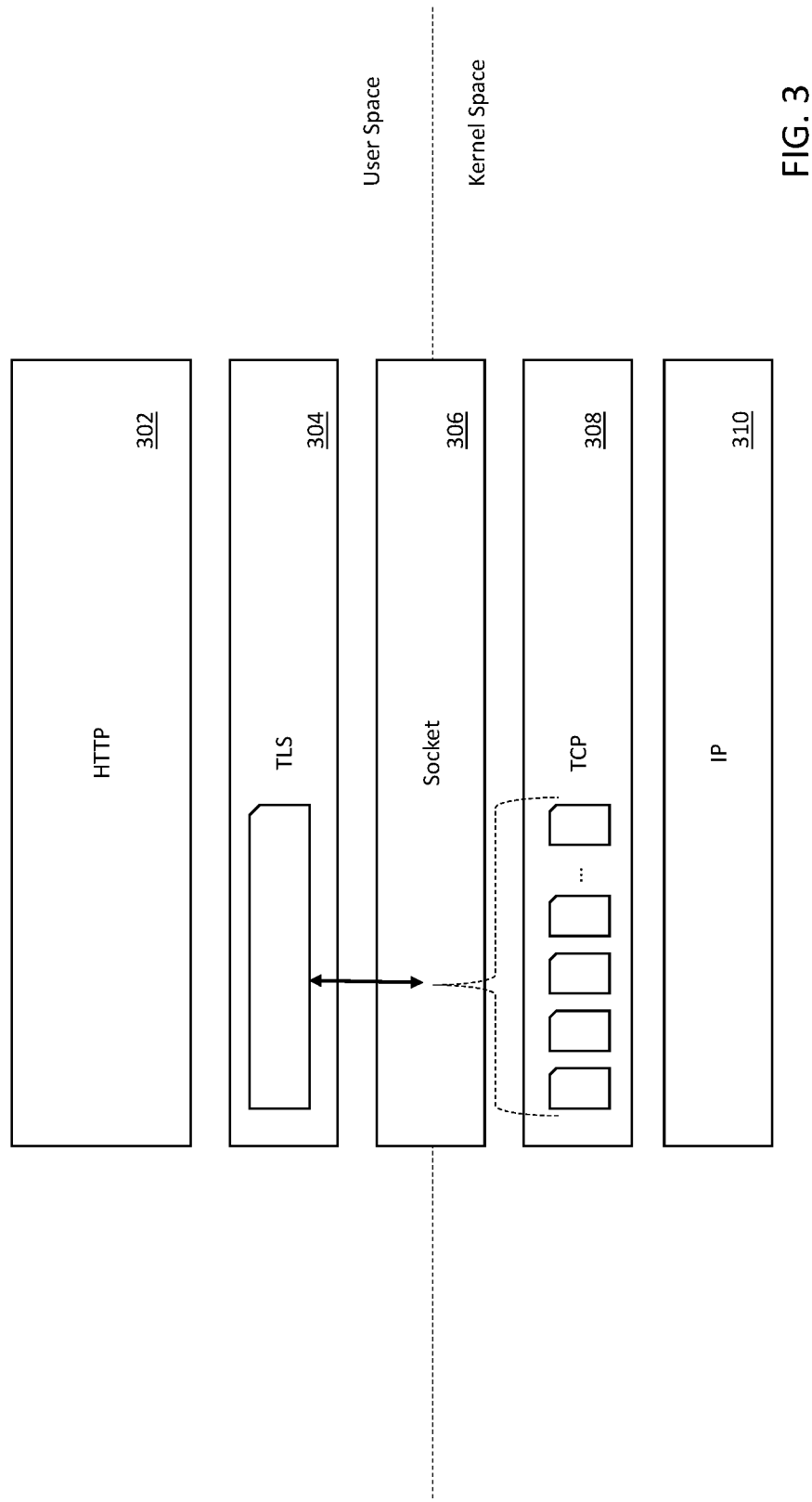
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream, and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
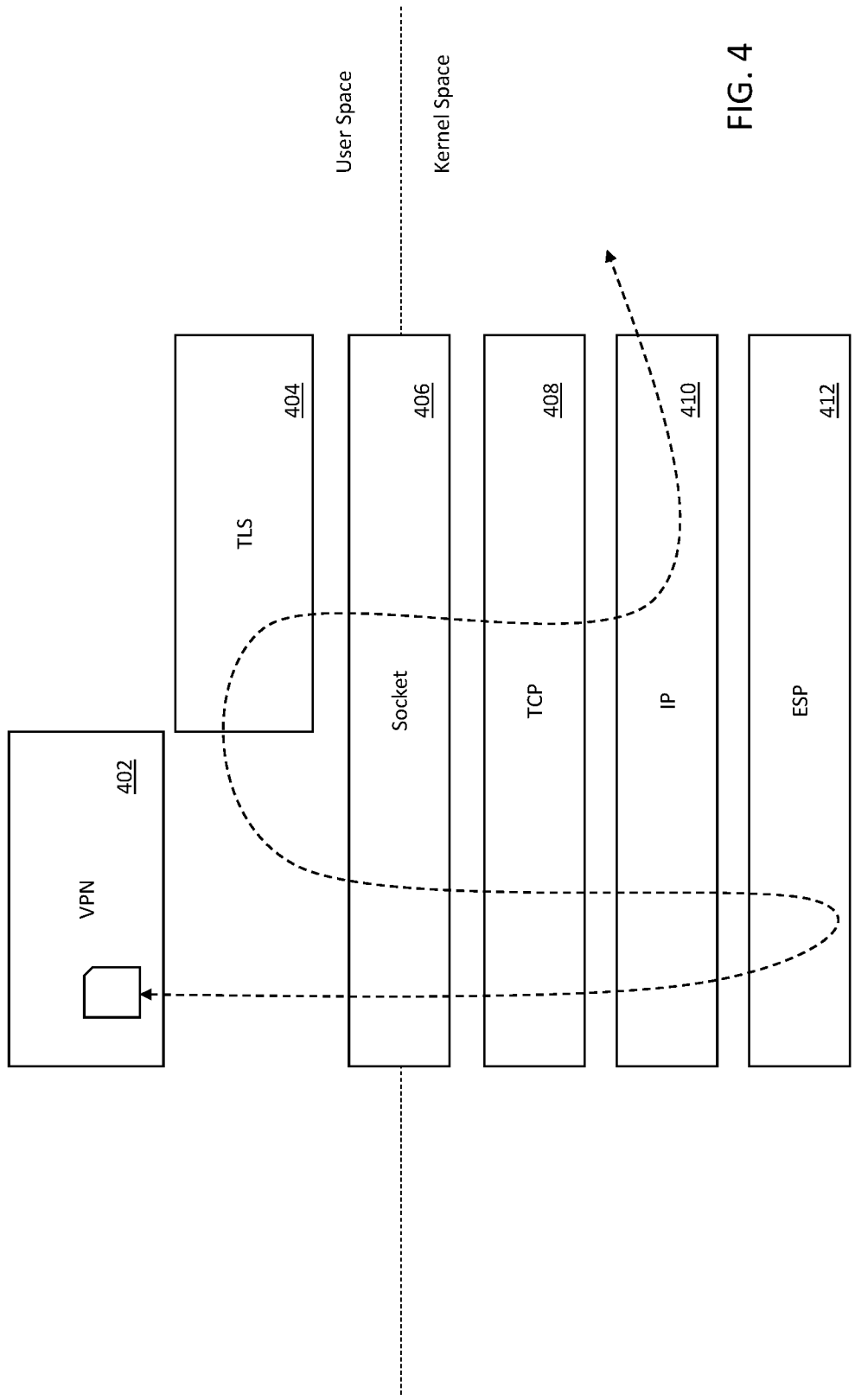
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
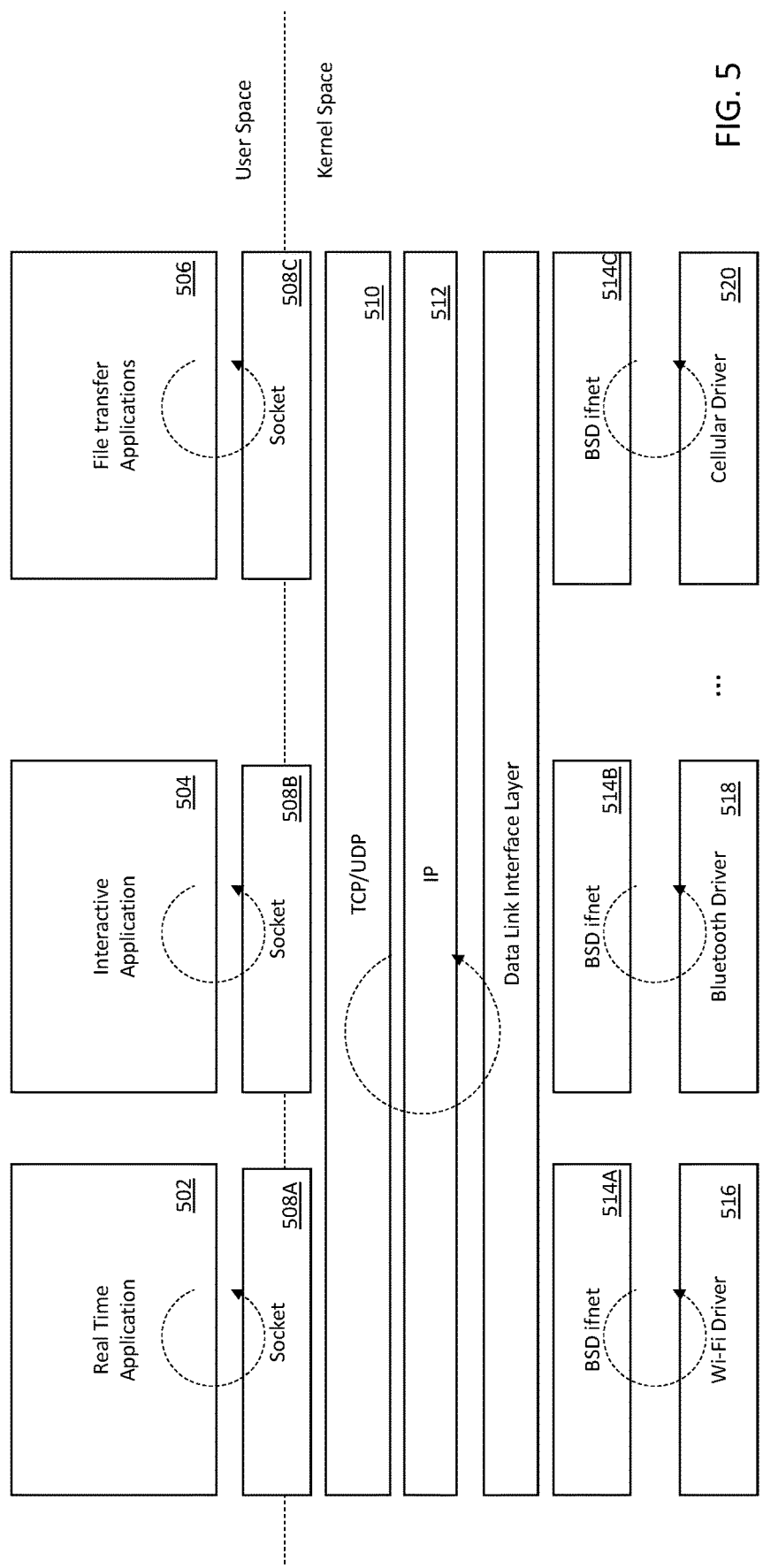
FIG. 5 is a logical block diagram of an exemplary implementation of application based tuning, useful for explaining various aspects of the present disclosure.

FIG. 5 illustrates a logical block diagram of an exemplary implementation of application based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mouses). Cellular network technologies 520 often provide non-contention based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary Networking Architecture—

A networking stack architecture and technology that caters to the needs of non-kernel based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

In one exemplary embodiment, a networking stack architecture is disclosed that provides an efficient infrastructure to transfer data across domains (user space, non-kernel, and kernel). Unlike the traditional networking paradigm that hide the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket based communication. Additionally, direct transfer can improve observability and accountability with traffic monitoring.

In one such variant, a simplified data movement model that does not require mbufs (memory buffers) is described in greater detail herein. During one such exemplary operation, the non-kernel processes can efficiently transfer packets directly to and from the in-kernel drivers.

In another embodiment, a networking stack architecture is disclosed that exposes the networking protocol stack infrastructure to user space applications via network extensions. In one such embodiment, the network extensions are software agents that enable extensible, cross-platform-capable, user space control of the networking protocol stack functionality. In another such embodiment, an in-process user space networking stack facilitates tighter integration between the protocol layers (including TLS) and the application or daemon. In some cases, the user space architecture can expose low-level networking interfaces to transport protocols and/or encapsulation protocols such as UDP, TCP, and QUIC; and enable network protocol extensions and rapid development cycles. Moreover, artisans of ordinary skill in the related arts, given the contents of the present disclosure, will readily appreciate that the various principles described herein may be applied to a variety of other operating systems (such as Windows, Linux, Unix, Android), and/or other cross platform implementations.

In some variants, exemplary embodiments of the networking stack can support multiple system-wide networking protocol stack instances (including an in-kernel traditional network stack). Specifically, in one such variant, the exemplary networking stack architecture coexists with the traditional in-kernel networking stack so as to preserve backwards compatibility for legacy networking applications. In such implementations, the in-kernel network stack instance can coexist with the non-kernel network stack via namespace sharing and flow forwarding.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

In one such implementation, load balancing for multiple networking stacks is handled within the kernel, thereby ensuring that no single networking stack (including the in-kernel stack) monopolizes system resources.

As a related variant, current/legacy applications can be handled within the in-kernel stack. More directly, by supporting a separate independent in-kernel BSD stack, legacy applications can continue to work without regressions in functionality and performance.

Figure 6:
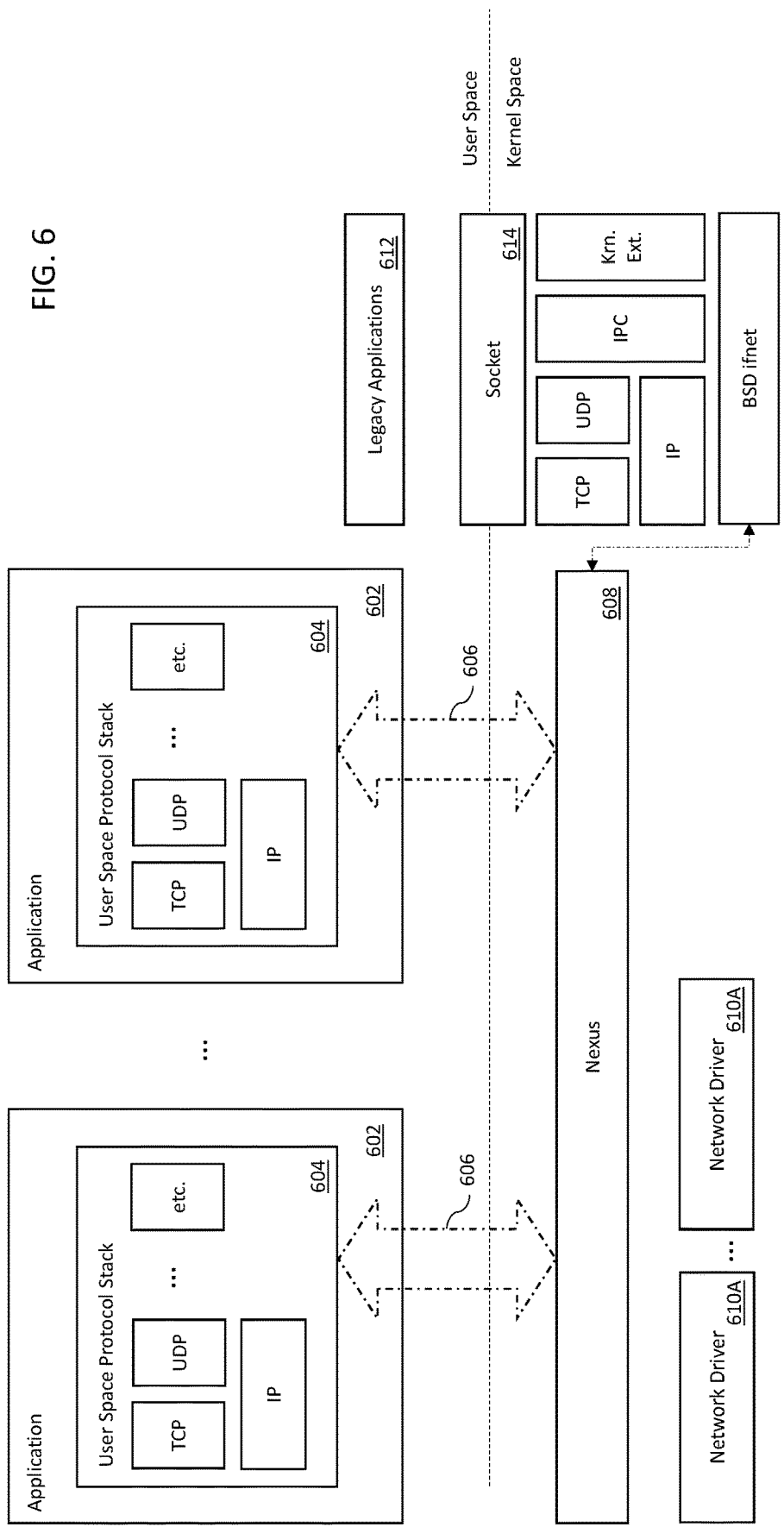
FIG. 6 is a logical representation of an exemplary networking stack architecture, in accordance with the various aspects of the present disclosure.

FIG. 6 illustrates one logical representation of an exemplary networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary I/O Infrastructure

In one exemplary embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor based object, rather than as data. In order to access the data, the process de-references the file descriptor for direct access to the shared memory within kernel space. In one such implementation, the file descriptor based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.).

In one exemplary embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

More generally, unlike prior art solutions which relied on specialized networking stack compositions to provide different degrees of visibility at different layers, the monitoring schemes of the present disclosure provide consistent system-wide channel monitoring infrastructures. Consistent frameworks for visibility, accounting, and debugging greatly improve software maintenance and upkeep costs.

Additionally, simplified schemes for egress filtering can be used to prevent traffic spoofing for user space networking stack instances. For example, various embodiments ensure that traffic of an application cannot be hijacked by another malicious application (by the latter claiming to use the same tuple information, e.g. TCP/UDP port).

In one exemplary embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus—

In one exemplary embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-tokernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one exemplary embodiment, the nexus 608 may additionally ensure that there is fairness and/or appropriately prioritize each of its connected stacks. For example, within the context of FIG. 6, the nexus 608 balances the network priorities of both the existing user space application networking stacks 604, as well as providing fair access for legacy socket based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one exemplary embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket based access. For example, user application networking space may be more heavily weighted to improve overall performance or functionality, whereas legacy socket based access may be preferred where legacy applications are preferentially supported (e.g., see Protocol Onloading Offloading, discussed infra).

Exemplary Network Extensions

In one exemplary embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/or other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority, or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

Namespace Sharing & Flow Forwarding Optimizations

In one exemplary optimization of the present disclosure, the nexus includes a namespace registration and management component that manages a common namespace for all of its connected networking stack instances. As a brief aside, a namespace generally refers to a set of unique identifiers (e.g., the names of types, functions, variables) within a common context. Namespaces are used to prevent naming "collisions" which occur where multiple processes call the same resource differently and/or call different resources the same.

In one such implementation, the shared networking protocol has a common namespace (e.g., {Address, Protocol, and Port}) across multiple networking stack instances. Sharing a namespace between different networking stacks reduces the amount of kernel burden, as the kernel can natively translate (rather than additionally adding a layer of network address translation).

For example, if a first application acquires port 80, the namespace registration ensures that other applications will not use port 80 (e.g., they can be assigned e.g., port 81, 82, etc.) In some such implementations, legacy clients may use default namespaces that conflict (e.g., a default web client may always select port 80); thus the shared namespace registration may also be required to force a re-assignment of a new identifier (or else translate for) such legacy applications.

In one exemplary embodiment, the namespace registration and management components control flow-switching and forwarding logic of each flow-switch nexus instance. For example, as previously noted, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

For example, during normal operation when an application requests a port, the namespace registration and management will create a flow and assign a particular port to the application. Subsequent packets addressed to the port will be routed appropriately to the flow's corresponding application. In one such variant, packets that do not match any registered port within the shared namespace registration and management will default to the legacy networking stack (e.g., the flow-switch assumes that the unrecognized packet can be parsed and/or ignored by the fallback legacy stack).

Artisans of ordinary skill in the related arts will readily appreciate, given the contents of the present disclosure that disparate and/or otherwise distinct namespace registrations and/or management components may be preferable based on other implementation specific considerations. For example, some implementations may prefer to shield namespaces from other external processes e.g., for security and/or privacy considerations. In other implementations, the benefits associated with native namespace translation may be less important than supporting legacy namespaces.

Protocol Onloading and Offloading

In the foregoing discussions, the improvements to user space operation may be primarily due to the user space networking stack, as shown in FIG. 6. However, various embodiments of the present disclosure also leverage the existing legacy host networking infrastructure to handle networking transactions which are unrelated to user experience.

Colloquially, the term "hardware offload" may be commonly used to denote tasks which can be handled within dedicated hardware logic to improve overall processing speed or efficiency. One such example is the cyclic redundancy check (CRC) calculation which is an easily parameterized, closed, iterative calculation. The characteristics of CRC calculation lend itself to hardware offload because the CRC does not benefit from the flexibility of a general purpose processor, and CRC calculations are specialized functions that are not transferable to other processing operations.

By analogous extension, as used herein, the term "protocol offload" may refer to processes that should be handled within the legacy networking stack because they are not specific to a user space application or task. In contrast, the term "protocol onload" may refer to processes that should be handled within a user space networking stack because they are specific to a user space application or task and benefit the overall performance. As a general qualitative criteria, tasks which are "fast" (e.g., generally UDP/TCP/IP based user space applications) are protocol onloaded to improve user performance; in contrast "slow" tasks (e.g., ARP, IPv6 Neighbor Discovery, Routing table updates, control path for managing interfaces, etc.) are protocol offloaded.

For example, consider Address Resolution Protocol (ARP) request handling; when an ARP request comes in, the host processor responds with a reply. However, the ARP request is non-specific to a user space application; rather the ARP reply concerns the holistic system. More generally, any networking process that is not specific to an application space can be implemented within the kernel under legacy techniques. Alternatively, any process that can be handled regardless of device state should remain with the kernel (e.g., the kernel persists across low power states, and is never killed).

By allowing the mature in-kernel networking stack to retain ownership of certain control logic (e.g. routing and policy table, interface configuration, address management), various embodiments of the present disclosure avoid "split-brain" behaviors. In other words, the kernel ensures that networking data and/or availability remains consistent regardless of the user space application availability.

Exemplary User Space Networking Stack—

Figure 7:
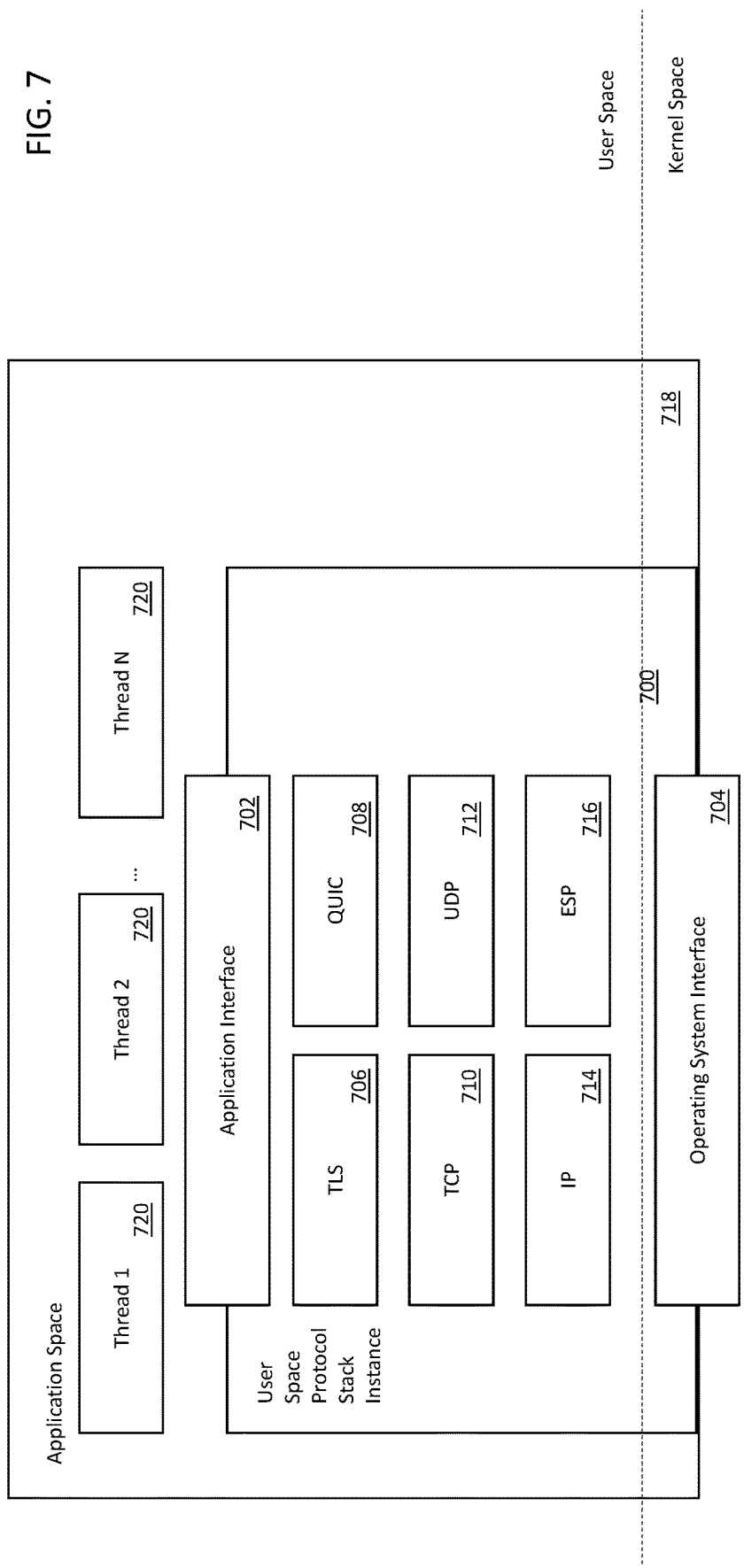
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared memory via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space based network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Exemplary Proxy Agent Application Operation

Figure 8:
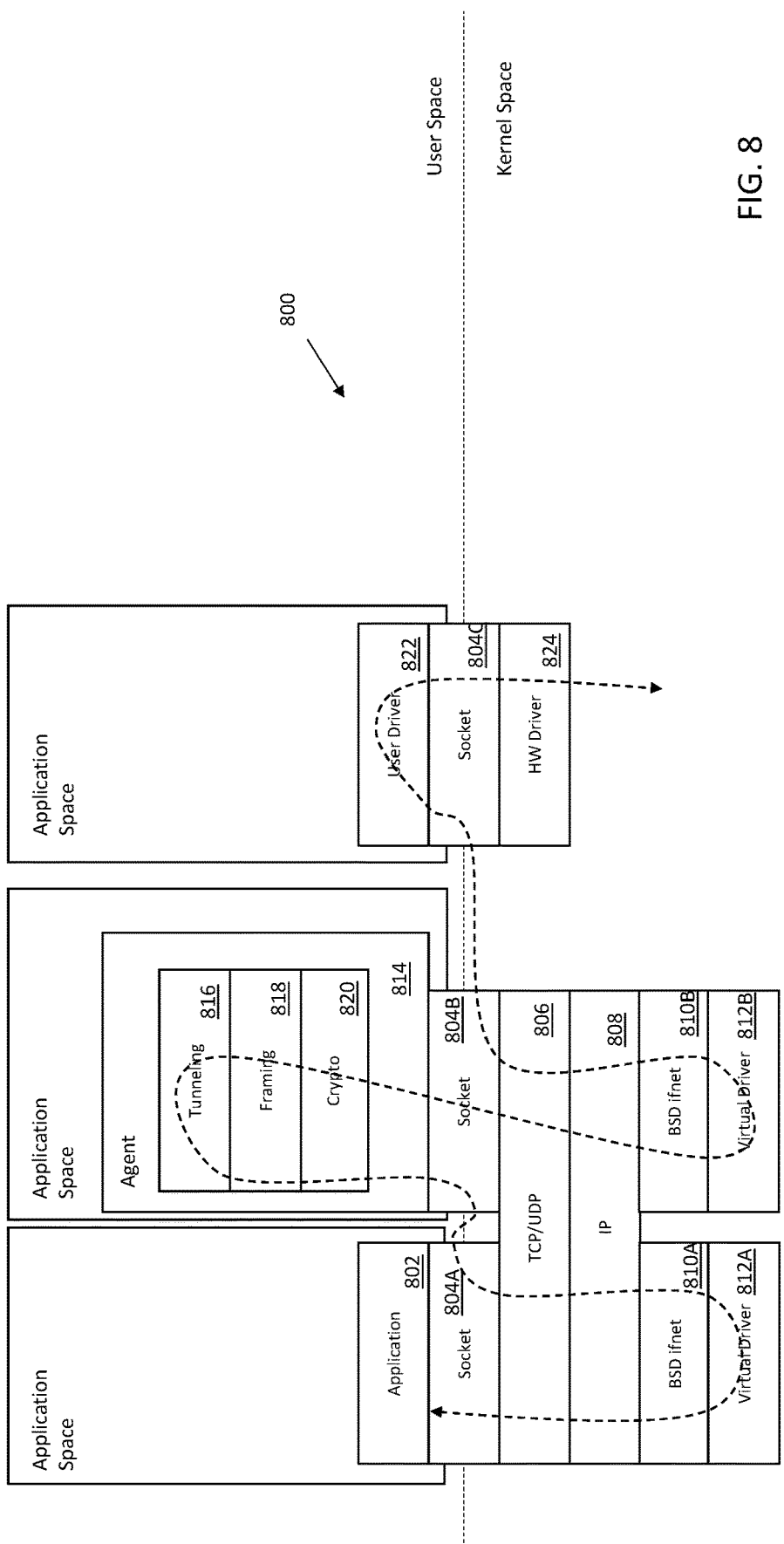
FIG. 8 is a logical flow diagram useful to summarize the convoluted data path taken for a prior art application using a proxy agent application within the context of the traditional networking stack, useful for explaining various aspects of the present disclosure.

FIG. 8 depicts one logical flow diagram useful to summarize the convoluted data path taken for a prior art application using a proxy agent application within the context of the traditional networking stack. As shown therein, an application 802 transmits data via a socket 804A to route data packets to a proxy agent application 814 via a TCP/IP 806/808 and a BSD network interface 810A. The data packets enter kernel space; this is a first domain crossing which incurs validation and context switching penalties.

Inside the kernel, the data is divided/copied/moved for delivery via the TCP/IP stack 806/808 to the BSD network interface 810A. The BSD network interface 810A routes the data to a virtual driver 812A. These steps may introduce buffering delays as well as improper buffer sizing issues such as buffer bloat.

In order to access the application proxy (which is in a different user space), the virtual driver reroutes the data to a second socket 804B which is in the different user space from the original application. This constitutes a second domain crossing, which incurs additional validation and context switching penalties.

In user space, the data enters an agent 814 which prepares the data for delivery (tunneling 816, framing 818, and cryptographic security 820). Thereafter, the proxy agent 814 transmits the prepared data via a socket 804B to route data packets to a user space driver 822 via the TCP/IP 806/808 and a separate BSD network interface 810B. Again, the data is passed through the socket 804B. This is a third domain crossing, with validation and context switching penalties.

Inside the kernel, the data is divided/copied/moved for delivery via the TCP/IP stack 806/808 to a BSD network interface 810B. The steps of The BSD network interface 810B routes the data to a virtual driver 812B. These steps introduce additional buffering delays as well as improper buffer sizing issues such as buffer bloat.

Finally, the virtual driver 812B reroutes the data to the user space driver (e.g., a Universal Serial Bus (USB) driver), which requires another socket transfer from 804B to 804C; the data crosses into the user space for the user based driver 822, and crosses the domain a fifth time to be routed out the USB Hardware (H/W) driver 824. Each of these domain crossings are subject to the validation and context switching penalties as well as any buffering issues.

Figure 9:
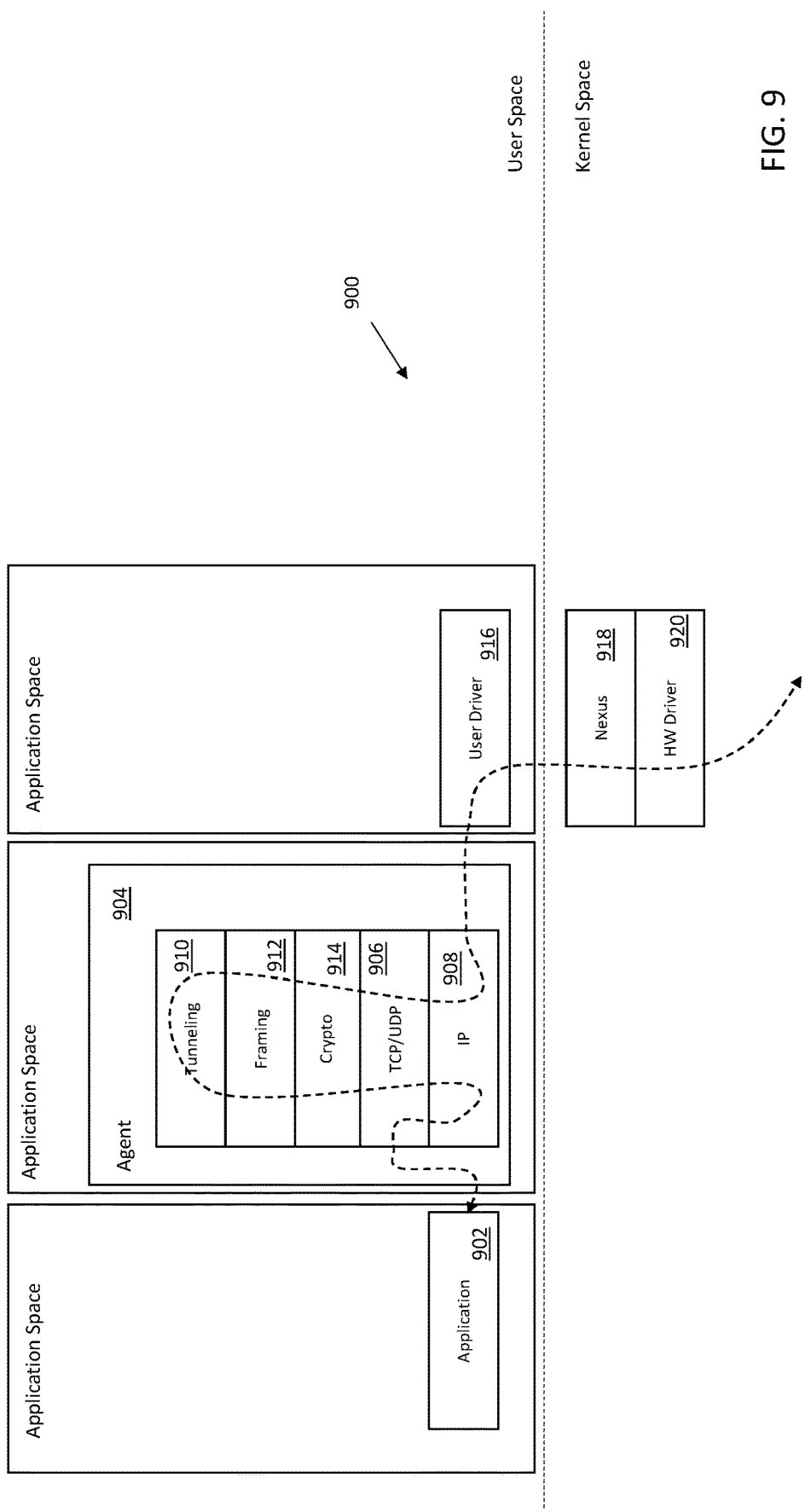
FIG. 9 is a logical flow diagram useful to summarize an exemplary proxy agent application within the context of the user space networking stack, in accordance with various aspects of the present disclosure.

FIG. 9 depicts one logical flow diagram useful to summarize an exemplary proxy agent application within the context of the user space networking stack, in accordance with the various aspects of the present disclosure.

As shown therein, an application 902 provides data via shared memory space file descriptor objects to the agent 904. The agent 904 internally processes the data via TCP/IP 906/908 to the tunneling function 910. Thereafter, the data is framed 912, cryptographically secured 914, and routed via TCP/IP 906/908 to the user driver 916. The user driver uses a channel I/O to communicate with nexus 918 for the one (and only) domain crossing into kernel space. Thereafter, the nexus 918 provides the data to the H/W driver 920.

When compared side-by-side, the user space networking stack 900 has only one (1) domain crossing, compared to the traditional networking stack 800 which crossed domains five (5) times for the identical VPN operation. Moreover, each of the user space applications could directly pass data via function calls within user memory space between each of the intermediary applications, rather than relying on the kernel based generic mbuf divide/copy/move scheme (and its associated buffering inefficiencies).

Exemplary Communication Stack Coexistence—

The exemplary user space networking architecture enables multiple instances of communication stacks to operate concurrently. Ideally, multiple coexisting applications and threads should not interfere with one another, and could interact to provide desirable synergies. However, each user space communication stack of the coexisting applications and threads operates in isolation from other user space communication stacks. Thus, absent inter-process communication mechanisms, each user space communication stack is unable to e.g., determine the resources that are consumed by other stacks, reserve resources, and/or share resources.

As a further complication, certain "host" stack functionality is stably implemented within the legacy Berkley Software Distribution (BSD) stack. In some cases, so-called "host" functionality may be specific to a device (the host), rather than the device's user applications. For example, Address Resolution Protocol (ARP) is a common host functionality that is performed by the BSD stack, but can be universally leveraged by existing networking applications. Converting existing ARP to user space networking stacks may be both counterproductive and provide marginal (if any) benefit.

As a result, exemplary user space networking architectures require schemes and mechanisms for stack coexistence. Various embodiments of the present disclosure are directed to providing coexistence mechanisms for inter-process user space networking stack mechanisms and/or host stack coexistence.

Figure 10A:
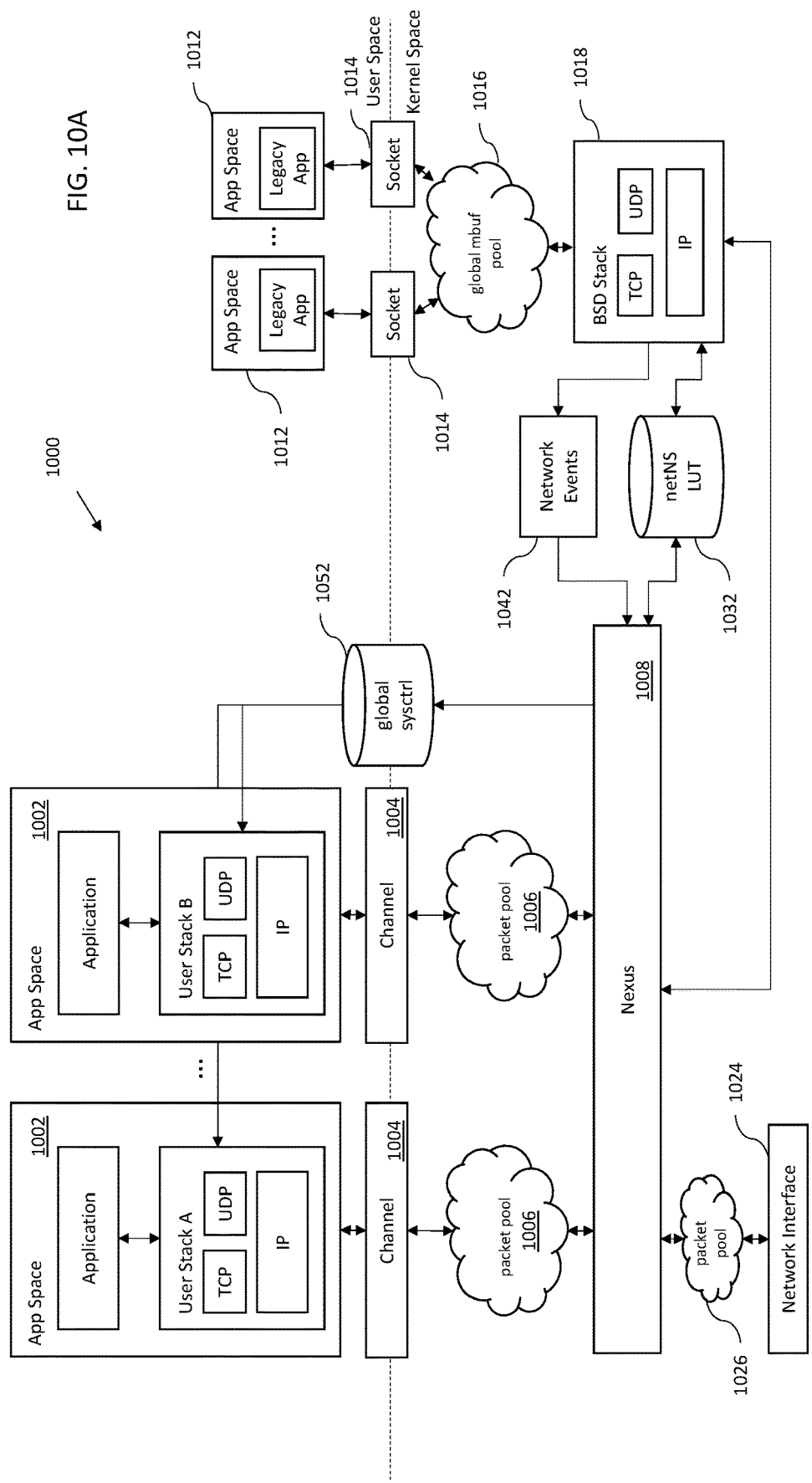

Referring now to FIG. 10A, one exemplary implementation for a system 1000 that addresses the foregoing deficiencies is shown and described in detail. This exemplary system 1000 may be implemented through the use of a non-transitory computer-readable medium (e.g., a computer-readable apparatus) which may be embodied as software, hardware, and/or combinations of the foregoing. The non-transitory computer-readable medium may include one or more computer programs with computer-executable instructions, that when executed by, for example, one or more processing apparatus may implement one or more of the methodologies described subsequently herein.

The exemplary system 100 includes one or more user space applications 1002 including user space communication stacks, channels 1004, pools of resources 1006, and a nexus 1008. In order to support legacy operation, one or more legacy user applications 1012 are connected via network sockets 1014, to a global buffer pool 1016, and a legacy BSD communication stack 1018. The nexus 1008 transacts data with an external network via a driver packet pool 1026 and a network interface 1024. As but one illustrative example, the nexus 1008 may include a flow switch for transacting TCP/IP data.

During operation, each user space communication stack 1002 may write data packets for transmission via channels 1004 which are coupled to respective pools of dedicated resources 1006. The user packet pool 1006 data is copied to the driver packet pool 1026 for transmission via the network interface 1024. Similarly, legacy applications 1012 may write data packets into a global mbuf pool 1016 via sockets 1014. The legacy BSD communication stack 1016 can packetize and transfer data from the global mbuf pool 1016 to the driver packet pool 1026 via the nexus 1008. The management and operation of driver packet pool resources 1026 is described in co-owned and co-pending U.S. patent application Ser. No. 16/144,992 filed Sep. 27, 2018 and entitled "Methods and Apparatus for Single Entity Buffer Pool Management", incorporated supra.

Additionally shown are: (i) a NetNS look-up-table data structure 1032, (ii) a network event logic 1042, and (iii) a shared sysctl data structure 1052. The operation of these components are in greater detail hereinafter.

NetNS for Port Tuple Arbitration

In one exemplary embodiment, the kernel space BSD stack and the user space protocol stack instances need an efficient mechanism to share and arbitrate the network namespace. The network namespace determines which ports, source addresses, and/or destination addresses, can be used by the user space applications and/or kernel entities, etc. As a brief aside, in traditional communication stack implementations, a network connection is uniquely identified by a "tuple". A tuple includes information regarding the source and destination of a network connection. A "5-tuple" refers to a set of five different values that uniquely identifies a Transmission Control Protocol/Internet Protocol (TCP/IP)

connection from a source to a destination. It includes a source IP address, a source port number, a destination IP address, a destination port number, and the protocol that is in use (e.g., TCP). This information is generally stored and/or extracted from the header information of a packet.

In the context of server-type applications, the destination information of a network connection may not yet have been determined when, for example, a packet is sent out for discovery or as a query from a server-type application. For example, before a connection is established, a server-type application may send out a packet to discover what remote nodes are available to establish a connection. In such a scenario, an abbreviated "3-tuple" may be used for uniquely identifying the source that originated the packet (a destination is not yet known). A "3-tuple" includes a source IP address, a source port number, and the protocol.

Existing BSD stacks used a single networking stack instance to manage all connections; thus existing BSD stacks only had a single namespace to manage. In other words, the BSD stack could identify which tuples were used, reserved, invalid, and/or available to be assigned. In some cases, the BSD stack also could dedicate ports (or tuple) for host functionality. For example, legacy clients commonly use default namespace assignments for host accesses (e.g., port 80 is the default port for a client to access a server).

In the context of the exemplary multiple user space stacks described herein, each stack is isolated and unaware of the other user space stacks. Resource collisions can occur in a user space networking stack architecture when the communication stacks cannot tell which ports are taken or not taken in a given system. Collisions are particularly problematic for "default" tuples used in host functionality. For example, multiple applications may all default to the same port 80 for initial server accesses. As used herein, the term "collision" refers to a condition where multiple entities attempt to use the same resource.

FIG. 10B illustrates a shared namespace manager (NetNS) 1032 that enables sharing and arbitration of the network namespace between various stack instances of the exemplary system 1000. As shown therein, the NetNS 1032 allocates memory within kernel space to register and track tuple information for each user space communication stack 1002 and for the BSD stack 1018. Specifically, a 3-tuple entry for a first stack (User Stack A), a 5-tuple entry (User Stack B), and a 3-tuple entry for the legacy BSD communication stack 1018 (BSD Stack).

As described hereinafter, tuples are "registered" to their corresponding stacks within the allocated memory of NetNS 1032. In one exemplary embodiment, when a registration request is received the NetNS can e.g.: (i) assign/allocate a new tuple, (ii) modify or remove an existing tuple, and/or (iii) reject the registration request if no resources are available to support a tuple (e.g., where all the ports are taken, etc.) Notably, user space communication stacks may be dynamically instantiated and/or destroyed on an as-needed basis. Similarly, a BSD stack 1018 may also add and/or release tuples for its sockets. Some situations may also result in reclaiming and/or re-assigning multiple tuples for a BSD stack 1018. For example, a BSD stack 1018 that crashes could be restarted. Various schemes described hereinafter leverage the NetNS registration to implicitly or explicitly prevent collisions.

In one embodiment, the registration process may implicitly prevent collisions by ensuring that resources do not overlap. For example, in one exemplary variant, only available tuples are assigned to communication stack requests (e.g., requesting the next available tuple or a specific tuple).

In other embodiments, a range (or grouping) of tuples may be reserved for a communication stack. For instance, a legacy BSD communication stack can be given a distinct range of ports for host functionality (e.g., port 80 for HTTP), and a user space communication stack can be given another distinct range of ports for application specific functionality. By ensuring that the ranges of tuples do not overlap, the system 1000 can greatly reduce context switching and/or simplify collision avoidance logic. More directly, the non-overlapping ranges prevent tuple collisions between different communication stacks. In some cases, a subset of tuple ranges may also be easier to manage (e.g., smaller searches to identify reserved/available tuples.)

In alternative embodiments, the registration process may explicitly prevent collisions by explicitly checking (at the time of assignment) that resources do not overlap. For example, in one exemplary variant, the NetNS 1032 provides tuples on a first-come-first-served basis. Once the supply of tuples is exhausted, no further tuples can be assigned until a reserved tuple is freed. For example, in one such illustrative alternative, the NetNS 1032 may reuse the existing "bind" functionality of the BSD stack 1018. Existing BSD stacks bind ports to sockets; the bound port cannot be used by other sockets. Instead of binding sockets to ports, the binding functions can be leveraged to bind a port or range of ports to a user space communication stack. In other words, a user space application can explicitly request a port binding on the BSD communication stack to prevent collisions.

While the illustrated embodiment depicts the NetNS 1032 as a separate kernel space memory, artisans of ordinary skill in the related arts given the contents of the present disclosure will readily appreciate that alternative implementations may be substituted with equivalent success. Other embodiments may implement namespace sharing as part of the nexus 1008. Still other embodiments, may distribute copies of namespace registry to each user space stack. In one such variant, each distributed copy of the namespace registry may be obscured and/or represent a subset of the entire namespace for e.g., security and simplicity (a malicious or compromised user space stack would not reveal the registration information for the entire namespace).

Referring back to FIG. 10B, a NetNS 1032 may prioritize tuple information for a legacy BSD communication stack (within kernel space) 1018 differently than user space communication stacks 1002. For example, requests to add/remove registrations from NetNS 1032 by the BSD stack may be trusted (versus user space stacks that are not trusted). Artisans of ordinary skill in the related arts, given the contents of the present disclosure, will readily appreciate that the principles described herein may be used in any system having tiered privileges and/or trust levels. For example, other systems may have different levels of trust assigned to e.g., first party applications (developed by the device manufacturer), second party applications (developed by trusted vendors), and/or third party applications (provided from untrusted parties).

While FIG. 10B illustrates a NetNS look-up-table (LUT) data structure, other data structures could be substituted with equivalent success. Common examples include without limitation: arrays, linked lists, hash tables, pointer structures, ring buffers, etc. In the illustrated embodiment, the NetNS look-up-table (LUT) data structure stores both 3-tuple and 5-tuple data. However, other implementations may store only 3-tuples, only 5-tuples, or some other variant or hybrid thereof. For example, some devices only support a single common IP address and port (i.e., the destination IP address and port is identical for all stacks); as a result, only 3-tuples need to be stored (e.g., a source IP address, a source port number, and a protocol). In other cases, a nexus may only support e.g., the TCP protocol; under such variants, only 4-tuples need to be stored (e.g., a source IP address, a source port number, a destination IP address, a destination port number).

More generally, artisans of ordinary skill in the related arts given the contents of the present disclosure, will readily appreciate that the various principles described herein may be broadly applied to any shared namespace. As used herein, a namespace generally refers to a set of unique identifiers (e.g., the names of types, functions, variables) within a common context. Sharing and arbitration of namespace generally refers to the practice of using the namespace in a consistent manner among various instances and/or processes.

Host Stack Functionality Offload

In one exemplary embodiment, the user space communication stacks can leverage the existing legacy BSD stack to implement host functionality. As previously noted, the legacy BSD stack was a monolithic stack that handled all functions. While user space networking can be optimized for emerging applications, existing "host" stack functionality is stably implemented within the legacy BSD stack. Ideally, user stacks can offload host stack functionality. Two schemes for host stack functionality offload are described hereinafter: (i) user stack initiated, (ii) host stack event reporting (with asynchronous callback).

User stack initiated operation may be useful wherever the user stack has explicit and/or immediate need for a host stack function. For example, a flow switch may need to trigger the next hop node's address resolution through ARP (address resolution protocol) or NDP (neighbor discovery protocol) for a user stack data flow. To achieve that, the flow-switch calls into host stack provided interfaces, to trigger ARP/NDP lookup, and in doing so also registers a route event callback. The registered callback is later used by the host stack to deliver relevant events to the flow-switch asynchronously. The host stack performs the offloaded functionality, and returns the result to the flow switch which may then have these propagated up to the user stack. More directly, the host stack functionality offload can be treated by the flow switch as any other kernel function call.

In contrast, host stack event reporting provides a mechanism for asynchronous callback. Host stack events refer to "housekeeping" events that may be leveraged by any communication stack (user space or otherwise). For example, a host stack may periodically perform ARPs that multiple communication stacks might benefit from; the host stack events occur external to (asynchronous) the transaction flow of the user stacks, but nonetheless may be useful for their operation. By registering for host stack event reporting (via a network work item queue), user stacks can receive asynchronous callbacks for events of interest. Specifically, the flow switch (or user stack) may asynchronously receive host stack events.

As used herein, a callback includes a first set of computer instructions (or a reference to computer instructions) that are provided prior to the execution of a second set of computer instructions. For asynchronous callback, the first set is executed upon completion (or "return") of the second set of computer instructions. In contrast, synchronous callback refers to implementations where the first set is executed before the second set of computer instructions returns. Notably, while the following examples are provided in the context of asynchronous callbacks, artisans of ordinary skill in the related arts given the contents of the present disclosure will readily appreciate that synchronous callbacks may be substituted with equivalent success.

In one exemplary variant, asynchronous callbacks enable the multiple non-host stacks to receive host stack events without locking dependencies and/or excessive context switching churn. Specifically, the host stack functionality provided by the kernel space BSD stack can complete its operation and callback the interested user stacks thereafter. Any number of user space stacks can receive updates within the user space context without returning back to the host stack. In other words, asynchronous callbacks provide an additional benefit of avoiding context switching back and forth between user space and kernel space.

Figure 10C:
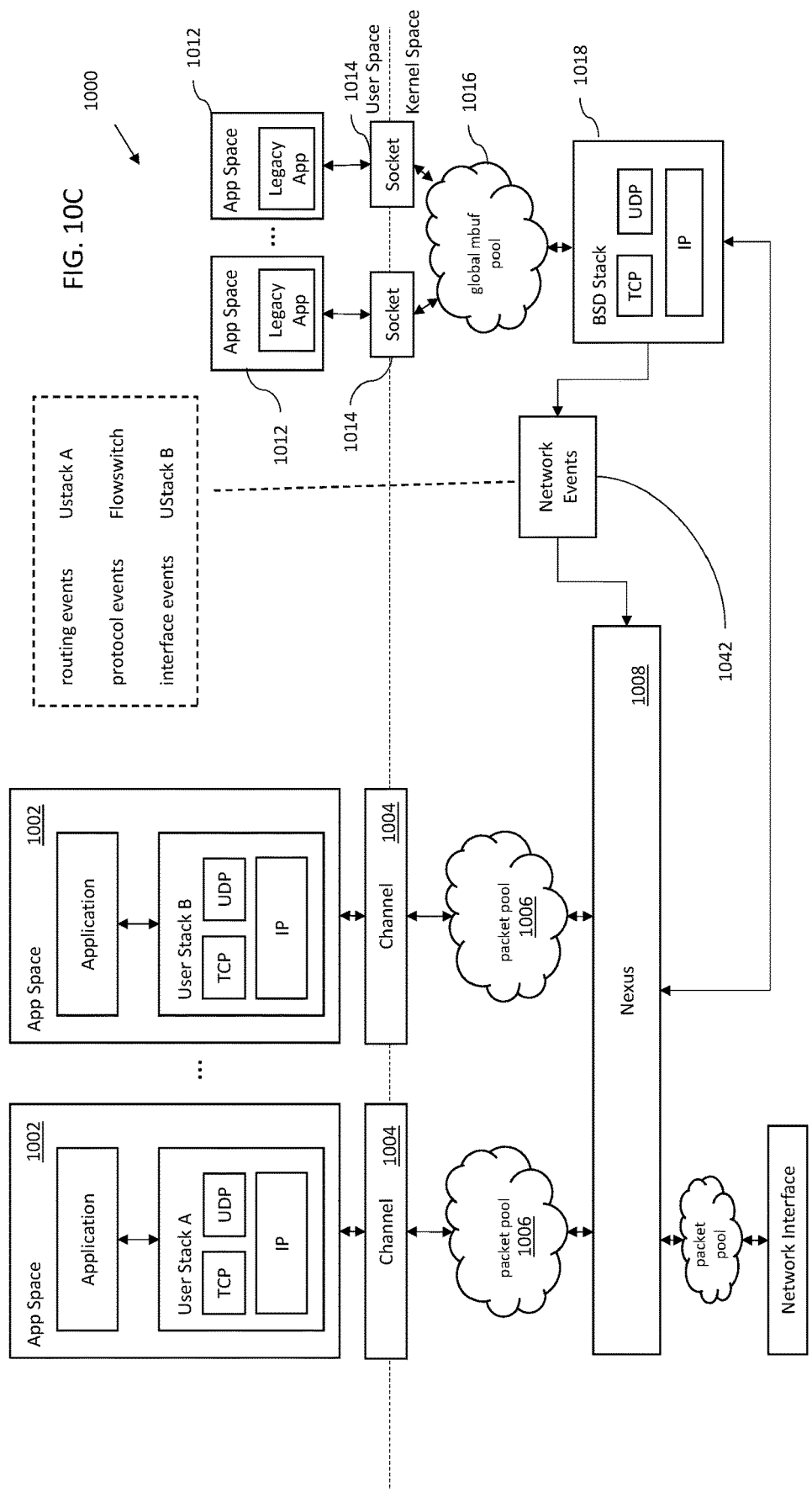

FIG. 10C illustrates a network event data structure 1042 that enables asynchronous callbacks. In one exemplary embodiment, the network event data structure 1042 includes a network work item queue (a table of entries). The network work item queue may be further subdivided into various categories of interest. For example, in one exemplary embodiment, the network work item queue is subdivided into: (i) routing updates, (ii) interface updates, and (iii) protocol updates. The following illustrative examples provide common usages for host stack functionality.

In one exemplary embodiment, networking work item queues can be used to provide routing updates to e.g., notify interested user stacks of changes to a flow routing table. As a brief aside, a routing table is a database which keeps track of routes, and uses these to determine which way to forward packet traffic. Gateways can share the contents of their routing table with other nodes requesting that information. Each routing table lists the address of the next device along the path to that destination (the next hop) for all reachable destinations. In traditional BSD stacks, a socket could perform a route lookup and the BSD stack would return a cached MAC or IP address of the next hop (e.g., the gateway).

Referring back to FIG. 10C, the system 1000 provides user space networking stacks 1002 with analogous route lookup functionality. In particular, the flow routes are cached for use by the nexus (flow switch) 1008 in a flow route cache maintained in kernel space. However, the user space/kernel space barrier prevents a user space networking stack 1002 from directly accessing the flow route cache. Instead, when a user space networking stack performs a route lookup, the flow switch 1008 checks the flow route cache. If a flow route has been cached (and is not stale), then the flow switch 1008 can provide the flow route to the user space networking stack 1002. Conversely, if the flow route does not exist (or if the cached route is stale), then the flow switch can call the BSD stack to update the flow route cache table. In some cases, the flow switch may additionally provide a "cookie" that identifies the calling stack (e.g., user stack A). Responsively, the BSD stack can perform the traditional route lookup and update the networking event data structure 1042 (network work item queue). Upon successfully updating the routing table, the BSD stack performs a callback to the flow switch. Responsively, the flow switch updates its flow route cache table from the BSD routing table, and returns the updated flow route to the user stack identified by the cookie (e.g., user stack A).

Similar to routing events, interface events can also be asynchronously reported to user stacks via the network event data structure 1042. As a brief aside, each hardware interface receives a source address. Under some circumstances, the source address may be changed. For example, a Wi-Fi network interface card (NIC) is assigned a source TCP/IP address by its connected router via e.g., Dynamic Host Configuration Protocol (DHCP). DHCP is a client/server protocol that automatically provides an IP address and other related configuration information such as the subnet mask and default gateway. Periodically, in order to ensure that the TCP/IP connection is still reachable, either the NIC or its connected router may force a renewal of the TCP/IP address.

User space networking stacks 1002 can use a cached version of the source TCP/IP address to e.g., generate its packet headers, etc. However, since the network interface is in the kernel space, the user space networking stacks 1002 are otherwise unaware of interface changes. By registering for interface events, each user space networking stack 1002 is notified of interface changes. Specifically, when a Wi-Fi NIC performs a DHCP address renewal, it also updates the network event data structure 1042. Any user stacks 1002 that have registered for the corresponding interface events will receive a callback to update its version of the source TCP/IP address.

In yet another exemplary embodiment, networking work item queues can be used to provide protocol updates. One such example of a networking protocol update is the so-called Internet Control Message Protocol (ICMP). ICMP is a supporting protocol in the Internet protocol suite. It is used by network devices, including routers, to send error messages and operational information indicating, for example, that a requested service is not available or that a host or router could not be reached. ICMP errors are addressed to the source IP address of the originating packet; for BSD architectures, an ICMP message is received by the BSD stack for any of its associated sockets. Specifically, the BSD stack extracts an ICMP message from the ICMP packet and provides the message to the appropriate socket. The ICMP message includes context information (usually a TCP header) that can be used by the BSD stack to identify the appropriate socket.

In the context of user space networking, multiple user space networking stacks are active and thus the ICMP messaging could be directed to any one of the user stack instances. It would be redundant and inefficient for each user stack to individually extract and examine the ICMP messaging; additionally, providing ICMP packets associated with one user application to all user stacks (and their associated applications) is undesirable for privacy and security considerations.

Various embodiments of the present disclosure provide ICMP packets to a BSD stack for host stack functionality. The BSD stack performs some validation steps (e.g., to ensure that the ICMP packet is legitimate) and sets the appropriate protocol event within the network event data structure 1042. Thereafter, the BSD stack calls back the flow switch to deliver the mapped protocol event for the ICMP packet along with relevant metadata. Responsively, the flow switch uses the metadata to identify the flow and perform further validation. After successful flow lookup and validation, the event is delivered to the user stack instance that owns the flow.

While the foregoing examples are provided in the context of a networking event data structure 1042, artisans of ordinary skill in the related arts will readily appreciate that virtually any asynchronous messaging mechanism may be substituted with equal success. More directly, asynchronous events allow different communication stacks (e.g., user stacks, host stacks, driver stacks, etc.) to determine/request host stack functionality without "locking" out other stacks. Asynchronous event reporting ensures that any stack can check network events on an as-needed basis (rather than with explicit function calls and locking mechanisms).

The foregoing examples are illustrative common usage scenarios; artisans of ordinary skill in the related arts will appreciate given the contents of the present disclosure that any device-specific operations can be performed by host stack, whereas application-specific operations should be handled by corresponding user stacks. From a performance standpoint, host stack functionality is performed by the kernel (which operates at a higher priority than user space applications). Additionally, host stack functionality is subject to security/privacy considerations which are inappropriate to expose to user applications.

System-Wide Shared Memory (RO)

As previously alluded to, the existing BSD architecture has historically been implemented over a diverse ecosystem of devices. Rather than using a one-size-fits-all solution, existing BSD stacks have parameterized many aspects of operation so as to e.g., enable both highly capable and commodity devices to use the same basic framework.

For example, sysctl is a BSD function that controls a group of parameters; these parameters enable fine-tuning of stack operation for experienced system administrators. Over 500 different system variables can be read and set using the sysctl function. As an example, the command sysctl kern.maxprocperuid returns the maximum number of processes allowed per unique identifier (UID); sysctl kern.maxprocperuid=1000 sets the maximum number of processes per UID to 1000.

Unfortunately, each user space networking stack infrastructures is specific to its user process; since each user process is segregated from other user processes, solutions for managing system-wide parameters are needed. In particular, efficient solutions are needed to initialize each user space network stack with heuristics from previous connections. Ideally, initialization parameters are shared anonymously and securely.

To these ends, various embodiments described herein implement a system-wide sysctl shared memory region. In one exemplary variant, the system-wide memory region is shared by all processes which minimizes memory usage (as compared to individual copies). Additionally, the system-wide memory region can be controlled via the sysctl command by an appropriately privileged user or kernel process to allow for system-wide optimizations. For example, some embedded devices and/or other special purpose devices may allow user space daemons to change sysctl parameters. Moreover, the system-wide shared memory may be independently accessed by processes either during initialization, or subsequent thereto. In this manner, changes to system-wide optimizations can be propagated to newly instantiated user stacks as well as existing stacks.

Figure 10D:
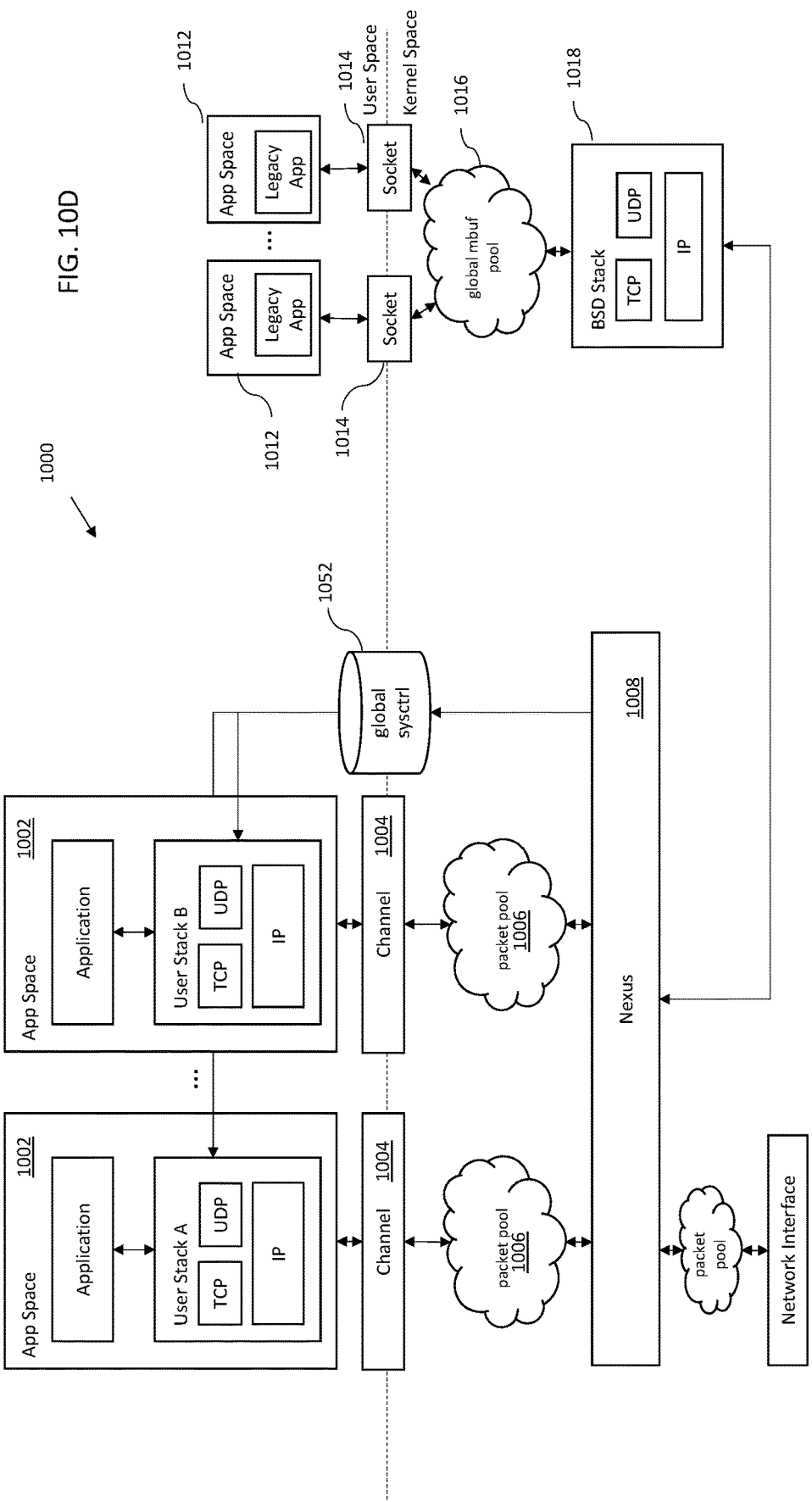

FIG. 10D illustrates one exemplary global data structure 1052 that enables read-only access to a global set of parameters. In one exemplary embodiment, the global data structure 1052 can be read and written to by kernel space processes (such as the nexus 1008); additionally, the global data structure 1052 can be read-only by the user space applications. For illustrative purposes consider Explicit Congestion Notification (ECN). ECN requires express support by both transmitter and receiver, and is not widely supported. However, ECN can greatly reduce the number of packets dropped by a TCP connection, which, by avoiding a retransmission, reduces latency and especially jitter. As a brief aside, an ECN-aware router may set an explicit message in the IP header to signal impending congestion (instead of dropping a packet). The receiver of the packet echoes the congestion indication to the sender, which reduces its transmission rate as if it detected a dropped packet. In other words, rather than inferring network congestion from packet loss, ECN networks can expressly trigger network congestion countermeasures without packet loss.

While the present disclosure describes a single data structure that is shared by all user space processes, other implementations may use multiple data structures that may be shared or dedicated for each user space process. More generally, various embodiments of the present disclosure are directed to providing parameters and/or configurations to a community of user stacks in a secure and discrete manner. In this manner, every user stack instance can benefit from system wide optimizations without exposing private data and/or leaking other user stack data.

Methods—

FIG. 11A is a logical block diagram of one exemplary method 1100 for host stack coexistence based on a shared data structure.

At step 1102 of the method 1100, a shared data structure is queried for a host stack information. In particular, host stack information may include information that is specific to the entity hosting the network connection; as distinguished from entity-specific information transported via the network connection. Common examples of entities include user space applications, user space processes, daemons, kernel processes, etc. More sophisticated networking topologies may also provide host stack information for entities locally or remotely via e.g., virtual private network tunnels, remote access, firewalls, local area networks, and/or any other form of network connectivity.

In other embodiments, while host stack information is generally specific to the entity hosting the network connection, such information does not exclude use for hosted entity-specific operation. Host stack information may be used for a variety of non-networked applications. For example, inter-user process pipes (e.g., upipes) may connect two or more user space applications together without the benefit of an interconnecting network, but may benefit from host stack information during configuration and/or operation. Similarly, user process to kernel process pipes (e.g., kpipes) may connect a user space application to kernel space processes. Additionally, a variety of different and/or hybridized communication stack implementations may be implemented to support a myriad of device ecosystems, the foregoing being purely illustrative. More generally, while the foregoing disclosure is presented in the context of a legacy kernel space network communications stack, artisans of ordinary skill in the related arts will readily appreciate given the contents of the present disclosure that the various principles described herein may find broad applicability over a range of applications.

In one exemplary embodiment, the data structure may be a user space data structure, a kernel space data structure, or a hybrid thereof. The data structure may be configured to share information in accordance with access control or other communications policy. For example, a process may have permissions to access the data structure via read-only, write-only, read-write, and/or any other form of permission. Still other variants may also use greater of fewer tiers and/or differentiations of access control. There may be multiple different levels of privilege in addition to merely user space and kernel space. For example, certain first party daemons may be allowed to run in user space with a higher level of privilege to access certain kernel space data structures.

As used herein, the terms "share", "shared", and "sharing" refer to data transactions that are permitted between different "space" domains and/or processes. For example, a shared data structure may be used to share kernel space information with a user process and vice versa. Similarly, a shared data structure may be used to share information from a first process with a second process. More generally, artisans of ordinary skill in the related arts will readily appreciate that sharing data in a cross-domain and/or inter-process manner may require independent scrutiny by the recipient in order to ensure that appropriate security and/or privilege protections remain intact.

Common examples of data structures include without limitation: tables, look-up-tables, arrays, two-dimensional arrays, hash tables, linked lists, records, databases, objects, etc. More generally, data structures are a collection of data values, metadata (data about the data), and/or their corresponding relationships and/or functions.

In one exemplary embodiment, the shared data structure can be queried. In one such variant, the shared data structure can be polled (e.g., periodically read for changes). Alternatively, the shared data structure may be coupled with a push type notification system. For example, some shared data structures may use an event based notification system. For event-based systems, events may be generated in response to changes to the shared data structure. Subsequent delivery or updating of the changes to the shared data structure may be reviewed at a different time e.g., on an as-needed basis, or other deferred updating scheme (asynchronously).

In one exemplary embodiment, the shared data structure stores a shared namespace that is used between multiple stacks. In one such variant, the shared data structure may store unique identifiers for network connections; e.g., so-called "tuples." Other common examples of shared namespace include without limitation: enumerated listings, named groups, pools of unique identifiers, randomly generated identifiers, etc. More generally, the shared data structure may be used to share and/or arbitrate for access to a fixed pool of resources; the shared data structure may contain resource utilization information (e.g., allocations, reservations, in-use, available, etc.)

In one exemplary embodiment, the shared data structure stores host stack functionality event notifications. In one exemplary embodiment, the host stack functionality may be subdivided into network events, interface events, and/or protocol events. Common examples of network events include without limitation: address renewal, network connectivity, and/or network congestion events. Common examples of network events include without limitation: address renewal, bus enumeration, hot plug/hot swap, functionality changes, etc. Common examples of protocol events include without limitation: registration, network discovery, network congestion recovery, error signaling, and/or network management.

In one exemplary embodiment, the shared data structure stores system parameters that are shared among multiple stacks of a device. System parameters may be used to optimize device specific operation. Common examples of system parameters include e.g., power settings, performance settings, virtualized memory and/or processing limitations, and/or any other device considerations.

At step 1104, if the host stack information is up-to-date, then the cached host stack information can be used at step 1106; otherwise, if the host stack information is not up-to-date, then the host stack is called to update the host stack information at step 1108.

In one exemplary embodiment, calling the host stack is performed in-line with the data path. In other embodiments, calling the host stack is performed out-of-line with the data path. As a brief aside, "in-line" with regard to the data path refers to a function call (e.g., host stack functionality) that is required for the data path processing to continue. For example, network connectivity may require the next hop information; under such a circumstance, the host stack ARP function may be called in-line. In-line calls lock the current stack processing. In contrast, out-of-line processing refers to a function call that can be done sooner or later; generally out-of-line processing may be deferred to a later time. In some situations, deferral comes with a cost (i.e., cannot be put off indefinitely).

In one exemplary embodiment, up-to-date information refers to information that is recent. For example, TCP/IP addresses may be renewed in accordance with a schedule and/or interval. In some such variants, data may be updated periodically, event-based, and/or as-needed. More generally, any correspondence between information and/or time may be used to determine when and/or how frequently data should be updated in order to constitute up-to-date.

In alternative embodiments, up-to-date information refers to information that is valid or accurate, regardless of time. Some such variants may robustly allow inaccurate information with some amount of performance loss. For example, sysctl parameters that are "stale" (not up-to-date) may not directly cause a system failure, however stacks that are incorrectly initialized may suffer from limitations (e.g., too much or too little memory, etc.).

Moreover, while the foregoing examples are presented in the context of information that is "up-to-date" or "stale", artisans of ordinary skill in the related arts will appreciate that different prioritization schemes may be substituted with equivalent success. For example, the shared data structure may include prioritization data that checks whether or not a sufficient threshold for priority or other importance has been met. Still other heuristics can be substituted with equivalent success.

Referring back to FIG. 11A, cached host stack information can be used at step 1106 for in-line data processing. In one embodiment, the shared data structure is used to share, arbitrate, reserve, consume and/or otherwise manipulate resources of a shared pool. For example, in one such example, network tuples can be assigned for different port accesses.

In one embodiment, the shared data structure stores event notifications. In one exemplary embodiment, the host stack functionality may be subdivided into network events, interface events, and/or protocol events. Event notifications may require further processing to determine what (if anything) changed. In some situations, event notifications may require additional processing in order to identify appropriate usage; for example, a flow switch that has an updated flow route cache may need to additionally apprise one or more connected applications of flow route updates. As but another example, a flow switch may be required to extract an ICMP message from an ICMP packet in order to identify the appropriate destination for the ICMP message.

Various other uses and/or applications for shared data structure operation will be readily appreciated by artisans of ordinary skill in the related arts. More generally, virtually any application executing on a device having a plurality of communication stacks may benefit from the various principles described herein.

As previously noted, at step 1108 the host stack may be called to perform host stack functionality. A function, thread, and/or process are all interchangeably used to refer to a set of computer readable instructions that when executed by a processor performs a sequential series of operations e.g., the host stack operations. A function call generally includes a number of arguments including e.g., the function to be performed, the data structures to be operated on, the data structures to provide results into, etc. A "callback" function may also be provided with a data structure that identifies the calling process, such that the called function can return to the calling process upon completion. In one exemplary embodiment, the calling process is uniquely identified with a "cookie" data structure; cookies are data structures that can store operational state information for a process in a secure and/or discrete manner. Cookies can be provided to a function call to ensure that the proper calling process is called back without leaking sensitive information.

Referring now to FIG. 11B, a logical block diagram of one exemplary method 1150 for servicing host stack functionality based on a shared data structure is disclosed.

In one exemplary embodiment, the host stack includes a legacy kernel space network communications stack. In one such variant, the legacy kernel space network communications stack is based on the Berkley Software Distribution (BSD) stack configured to transact internet protocol (IP) packets using e.g., TCP/IP and/or UDP/IP network protocols. In alternative embodiments, host stack functionality may be handled by a user space network communications stack (with the privileges and priority associated as such).

At step 1152 the host stack is called to perform one or more host stack functionalities. While the illustrated embodiment is described in the context of a user space stack initiated function call (such as originated via the method of FIG. 11A), artisans of ordinary skill in the related arts will readily appreciate that any function call (user space, kernel space, daemon, or otherwise) may be used to initiate host stack operation. For example, the host stack functionality may autonomously perform the host stack functionality as part of legacy support. In other examples, host stack functionality can be run in the background via e.g., a network daemon. In other such cases, host stack functionality may be periodically performed, aperiodically performed, and/or performed on the basis of a triggering event (e.g., connection loss, IP renewal, etc.).

In one exemplary embodiment, the called host stack functionality includes arbitration of a shared namespace. In other embodiments, the called host stack functionality includes reporting of host stack events and/or actions of interest. In still other embodiments, the called host stack functionality includes configuration parameters for overall host performance optimization. Still other examples of called host stack functionality and/or information are well known in the art, and may be substituted by artisans of ordinary skill in the related arts with equal success.

At step 1154, the host stack executes the requested host stack functionality. Host stack functionality is well known in the existing arts, and will not be further described. However, various aspects of host stack execution may be modified for non-monolithic coexistence operation.

In some embodiments, host stack functionality may be executed according to a higher priority than other user space functionalities. In some variants, host stack functionality may additionally lock resources which would otherwise be used for user space functions; for example, host stack operation may require that one or more user stack processes are backgrounded or terminated. As but one such illustrative example, a host device with limited memory may need to terminate or archive other user processes to perform host stack functionality. In other examples, a host stack that performs IP address renewal may need to terminate and/or gracefully end any existing network sockets with stale IP address information. For example, network connections with stale IP addresses may redirect to zero-filled pages (thereby emulating a network connectivity loss).

In other embodiments, host stack functionality may be executed with a same or lower priority than user space operation. For example, some devices may have limitations on resources that would significantly impact user experience. Consider a video playback device that receives streaming video and has been optimized to operate within a small memory footprint. Under such conditions, the user space stack networking stack may already take significant portions of the device's available memory; host stack functionality (such as ARP look ups, etc.) may be unnecessary and highly disruptive during streaming operation. As a result, the user space networking stack may be operated at a higher priority than host stack operations; host stack functionality can be deferred when the embedded device is streaming video.

Still other schemes for prioritizing host stack execution will be readily appreciated by artisans of ordinary skill in the related arts.

Upon completing host stack operation, the host stack may update the shared data structure at step 1156 and callback the user space stack at step 1158.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for performing host stack functionality, the method comprising:
    querying a shared data structure for information about a host stack to determine whether the information about the host stack is to be updated;
    in response to a determination that the information about the host stack is to be updated, calling the host stack to perform a host stack functionality, wherein the host stack includes a kernel space stack contained within a kernel space, and the host stack functionality includes a network event comprising an address renewal, a network connectivity, or a network congestion event, and the shared data structure stores event notifications for the network event;
    updating the shared data structure upon completion of operations for the host stack functionality performed by the host stack; and
    performing a callback to a user space networking stack contained within an application of a user space different from the kernel space.

2. The method of claim 1, wherein the shared data structure stores a shared namespace that is shared between multiple stacks including the host stack and one or more user space networking stacks, or stores unique identifiers for network connections.

3. The method of claim 1, wherein the host stack functionality further includes an interface event comprising a bus enumeration, a hot plug/hot swap event, or a functionality change event.

4. The method of claim 1, wherein the calling the host stack includes providing a callback cookie data structure to identify the user space networking stack.

5. The method of claim 1, wherein the calling the host stack is performed in-line with a data path, and the calling the host stack includes a number of parameters for the host stack to perform the host stack functionality.

6. The method of claim 1, further comprising:
    executing, by the host stack, the host stack functionality before updating the shared data structure.

7. The method of claim 6, wherein the executing the host stack functionality comprises an Address Resolution Protocol (ARP) look up, receiving an Internet Control Message Packet (ICMP), or renewing an internet protocol (IP) address for a network interface.

8. The method of claim 1, wherein the host stack functionality further includes a protocol event comprising a registration, a network discovery, a network congestion recovery, an error signaling, or a network management event.

9. The method of claim 1, wherein the performing the callback to the user space networking stack includes performing a callback to a flow switch shared by multiple user space networking stacks contained within different applications of the user space.

10. A system configured for managing user space communication stacks, the system comprising:
    a flow switch shared by a first user space networking stack contained within a first application of a user space and a second user space networking stack contained within a second application of the user space;
    memory configured to store a shared data structure containing information about a host stack that includes a kernel space stack contained within a kernel space different from the user space; and
    a processor coupled to the memory, and configured to:
        query the shared data structure for the information about the host stack to determine whether the information about the host stack is to be updated;
        in response to a determination that the information about the host stack is to be updated, call the host stack to perform a host stack functionality, wherein the host stack functionality includes a network event comprising an address renewal, a network connectivity, or a network congestion event, and the shared data structure stores event notifications for the network event;
        update the shared data structure upon completion of operations for the host stack functionality performed by the host stack; and
        perform a callback to the first user space networking stack after updating the shared data structure.

11. The system of claim 10, wherein the shared data structure stores a shared namespace that is shared between multiple stacks including the host stack, the first user space networking stack, and the second user space networking stack.

12. The system of claim 10, wherein to perform the callback to the first user space networking stack, the processor is configured to provide a callback cookie data structure to identify the first user space networking stack.

13. The system of claim 10, wherein the processor is further configured to execute the host stack functionality before updating the shared data structure, and wherein the host stack functionality includes Address Resolution Protocol (ARP) look up, receiving an Internet Control Message Packet (ICMP), or renewing an internet protocol (IP) address for a network interface.

14. The system of claim 10, wherein to perform the callback to the first user space networking stack, the processor is configured to perform a callback to the flow switch.

15. A non-transitory computer readable storage medium having one or more computer programs stored thereon, the one or more computer programs being configured to, when executed by a computing device, cause the computing device to perform operations comprising:
   querying a shared data structure for information about a host stack to determine whether the information about the host stack is to be updated;
   in response to a determination that the information about the host stack is to be updated, calling the host stack to perform a host stack functionality, wherein the host stack includes a kernel space stack contained within a kernel space, and the host stack functionality includes a network event comprising an address renewal, a network connectivity, or a network congestion event, and the shared data structure stores event notifications for the network event;
   updating the shared data structure upon completion of operations for the host stack functionality performed by the host stack; and
   performing a callback to a user space networking stack contained within an application of a user space different from the kernel space.

16. The non-transitory computer readable storage medium of claim 15, wherein the shared data structure stores a shared namespace that is shared between multiple stacks including the host stack and one or more user space networking stacks.

17. The non-transitory computer readable storage medium of claim 15, wherein the calling the host stack includes providing a callback cookie data structure to identify the user space networking stack.

18. The non-transitory computer readable storage medium of claim 15, wherein the calling the host stack is performed in-line with a data path, and the calling the host stack includes a number of parameters for the host stack to perform the host stack functionality.

19. The non-transitory computer readable storage medium of claim 15, wherein the performing the callback to the user space networking stack includes performing a callback to a flow switch shared by multiple user space networking stacks contained within different applications of the user space.

20. The non-transitory computer readable storage medium of claim 15, wherein the host stack functionality further includes:
   a protocol event comprising a registration, a network discovery, a network congestion recovery, an error signaling, or a network management event; or
   an interface event comprising a bus enumeration, a hot plug/hot swap event, or a functionality change event.

* * * * *

UNITED STATES PATENT AND TRADEMARK OFFICE
CERTIFICATE OF CORRECTION

PATENT NO. : 11,824,962 B2
APPLICATION NO. : 17/498574
DATED : November 21, 2023
INVENTOR(S) : Masputra et al.

It is certified that error appears in the above-identified patent and that said Letters Patent is hereby corrected as shown below:

In the Specification

In Column 6, Line 7, delete "0/S" and insert -- O/S --, therefor.

In Column 25, Line 50, delete "e.g.:" and insert -- e.g.,: --, therefor.

Signed and Sealed this
Thirteenth Day of February, 2024

Katherine Kelly Vidal
*Director of the United States Patent and Trademark Office*